(12) United States Patent
Koo et al.

(10) Patent No.: US 11,644,598 B2
(45) Date of Patent: May 9, 2023

(54) PROTECTION MEMBER FOR DISPLAY, DISPLAY DEVICE INCLUDING THE SAME AND METHOD FOR FABRICATING THE PROTECTION MEMBER FOR DISPLAY

(71) Applicant: Samsung Display Co., LTD., Yongin-si (KR)

(72) Inventors: Min Sang Koo, Seongnam-si (KR); Kyung Man Kim, Anyang-si (KR); Sang Hoon Kim, Hwaseong-si (KR); Min Hoon Choi, Seoul (KR); Seong Jin Hwang, Suwon-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/952,796

(22) Filed: Nov. 19, 2020

(65) Prior Publication Data

US 2021/0271002 A1   Sep. 2, 2021

(30) Foreign Application Priority Data

Feb. 27, 2020 (KR) .......................... 10-2020-0024486

(51) Int. Cl.
*G02B 1/14*   (2015.01)
*B32B 17/10*   (2006.01)
(Continued)

(52) U.S. Cl.
CPC .................. *G02B 1/14* (2015.01); *B32B 7/12* (2013.01); *B32B 17/10* (2013.01); *B32B 37/12* (2013.01); *B32B 38/0004* (2013.01); *B32B 2255/26* (2013.01); *B32B 2310/0843* (2013.01); *B32B 2457/20* (2013.01)

(58) Field of Classification Search
CPC .. G02B 1/14; B32B 7/12; B32B 17/10; B32B 2255/26; B32B 2457/20
See application file for complete search history.

(56) References Cited

U.S. PATENT DOCUMENTS

| 9,753,317 B2 | 9/2017 | Gupta et al. |
| 2009/0117291 A1* | 5/2009 | Nakajima ................ G02B 1/14 427/521 |

(Continued)

FOREIGN PATENT DOCUMENTS

| KR | 10-1323600 | 11/2013 |
| KR | 10-2014-0077818 | 6/2014 |

(Continued)

*Primary Examiner* — Michael Zhang
(74) *Attorney, Agent, or Firm* — Kile Park Reed & Houtteman PLLC

(57) ABSTRACT

A protection member, a display device and a method for fabricating a protection member for display are provided. A protection member for display includes a glass substrate including a surface and another surface facing each other in a thickness direction, and a side surface extended between the surface and the another surface, a coating layer that overlaps and contacts the side surface of the glass substrate, and includes a surface and another surface facing each other in a thickness direction, and a side surface extended between the surface and the another surface, and an impact absorbing pattern disposed on at least a portion of the coating layer and including at least one of grooves and holes.

19 Claims, 21 Drawing Sheets

(51) Int. Cl.
 B32B 37/12 (2006.01)
 B32B 7/12 (2006.01)
 B32B 38/00 (2006.01)

(56) References Cited

U.S. PATENT DOCUMENTS

2015/0110990 A1* 4/2015 Chou .................... C03C 17/007
 428/76
2015/0168609 A1* 6/2015 Fukui .................... G02B 1/118
 359/601

FOREIGN PATENT DOCUMENTS

| KR | 10-1484452 | 2/2015 |
| KR | 10-2018-0061561 | 6/2018 |
| KR | 10-2020-0090292 | 7/2020 |

* cited by examiner

PROTECTION MEMBER FOR DISPLAY, DISPLAY DEVICE INCLUDING THE SAME AND METHOD FOR FABRICATING THE PROTECTION MEMBER FOR DISPLAY

CROSS-REFERENCE TO RELATED APPLICATION(S)

This application claims priority to and benefits of Korean Patent Application No. 10-2020-0024486 under 35 U.S.C. § 119, filed on Feb. 27, 2020 in the Korean Intellectual Property Office, the entire contents of which are incorporated herein by reference.

BACKGROUND

1. Technical Field

The disclosure relates to a protection member for a display, a display device including the same and a method for fabricating the protection member for display.

2. Description of the Related Art

A display device is a device that may display an image, and may include a display panel, such as an organic light emitting display panel or a liquid crystal display panel. The display device may include a protective member such as a window that may protect the display panel from an external impact. By way of example, the window may be widely applied to portable electronic devices, such as smart phones.

As a base material of a window, a transparent film or glass may be used. The film may be superior in flexibility to the glass and may be easily applied to a flexible display device. However, the film may be susceptible to scratches. The glass may have a higher strength than the film, and may have a flexible property in a case that the glass has a thin film thickness or an ultra thin film thickness. However, in a case that the glass is broken, fragments may scatter to cause injury to a user.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Aspects of the disclosure provide a protection member for a display, that may minimize damage due to an external impact and may maximize impact resistance while minimizing assembly tolerance.

Aspects of the disclosure also provide a display device that may minimize damage due to an external impact and may maximize impact resistance while minimizing assembly tolerance.

Aspects of the disclosure also provide a method for fabricating a protection member for a display, that may minimize damage due to an external impact and may maximize impact resistance while minimizing assembly tolerance.

However, aspects of the disclosure are not restricted to those set forth herein. The above and other aspects of the disclosure will become more apparent to one of ordinary skill in the art to which the disclosure pertains by referencing the detailed description of the disclosure given below.

An embodiment of a protection member for display may include a glass substrate that may include a surface and another surface facing each other in a thickness direction, and a side surface extended between the surface and the another surface, a coating layer that may overlap and contact the side surface of the glass substrate, and may include a surface and another surface facing each other in a thickness direction, and a side surface extended between the surface and the another surface, and an impact absorbing pattern disposed on at least a portion of the coating layer and including at least one of grooves and holes.

At least one of the surface and the another surface of the coating layer may include an uneven surface.

The impact absorbing pattern may be disposed outside of the side surface of the glass substrate.

At least one of the grooves and the holes may not overlap the glass substrate in the thickness direction.

The coating layer may expose the surface of the glass substrate, and in the outer region of the side surface of the glass substrate, the surface of the coating layer may be located on an extension surface of the surface of the glass substrate.

The another surface of the coating layer may overlap the another surface of the glass substrate.

The another surface of the coating layer may be parallel to the surface of the coating layer and the surface of the glass substrate.

The protection member may further include a bonding layer disposed on the another surface of the coating layer; and a film layer disposed on another surface of the bonding layer, wherein the side surface of the coating layer and side surfaces of the bonding layer and the film layer may be aligned with each other.

The side surfaces of the coating layer may be formed by cutting.

The coating layer may include a substrate overlapping portion overlapping the glass substrate and an outer protruding portion protruding outward from the side surface of the glass substrate, wherein the impact absorbing pattern disposed on the outer protruding portion of the coating layer, and the thickness of the outer protruding portion of the coating layer may be substantially equal to the sum of the thickness of the substrate overlapping portion and the thickness of the glass substrate overlapping the overlapping portion.

The glass substrate may include a compression region and a tensile region, and the compression region may be adjacent to the surface, the another surface and the side surface of the glass substrate.

The coating layer may include at least one of epoxy acrylate resin, polyester acrylate resin, polyether acrylate resin, urethane acrylate resin, acrylic acrylate resin, unsaturated polyester, urethane resin, acrylonitrile-butadiene-styrene (ABS) resin, and rubber.

An embodiment of a display device may include a display panel, and a protection member disposed on a surface of the display panel, wherein the protection member may include a glass substrate that may include a surface and another surface facing each other in a thickness direction, and a side surface extended between the surface and the another surface, a coating layer that may overlap and contact the side surface of the glass substrate, and may include a surface and another surface facing each other in a thickness direction, and a side surface extended between the one surface and the another surface, an impact absorbing pattern disposed on at least a portion of the coating layer and including at least one of grooves and holes, a bonding layer disposed on the another surface of the coating layer; and a film layer disposed on the another surface of the bonding layer, wherein the side surface of the coating layer and side surfaces of the bonding layer and the film layer may be aligned with each other.

The impact absorbing pattern may be disposed outside of the side surface of the glass substrate.

At least one of the surface and the another surface of the coating layer may include an uneven surface.

An embodiment of a method for fabricating a protection member for display may include preparing a glass substrate including a surface and another surface facing each other in a thickness direction, and a side surface extended between the surface and the another surface, coating a functional composition on the glass substrate to form a coating layer overlapping the another surface and the side surface of the glass substrate, forming an impact absorbing pattern on the coating layer, forming at least one of grooves and holes in the impact absorbing pattern, and cutting a surface of the coating layer located outside of the side surface of the glass substrate.

The method may further include repairing the cut surface of the coating layer after the cutting.

The repairing of the cut surface of the coating layer may include repairing the cut surface by laser irradiation.

The repairing of the cut surface of the coating layer may be performed by a laser sintering method.

The method may further include sequentially laminating a bonding layer and a film layer on another surface of the coating layer after the forming of the impact absorbing pattern, wherein the cutting may include cutting the film layer, the bonding layer and the coating layer together.

According to embodiments of the disclosure, it may be possible to provide a protection member for display, a display device including the same and a method for fabricating the protection member for display, which may minimize damage due to external impact and impact resistance while minimizing assembly tolerance.

The effects of the disclosure are not limited to the aforementioned effects, and various other effects are included in the specification.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

Figure 1:
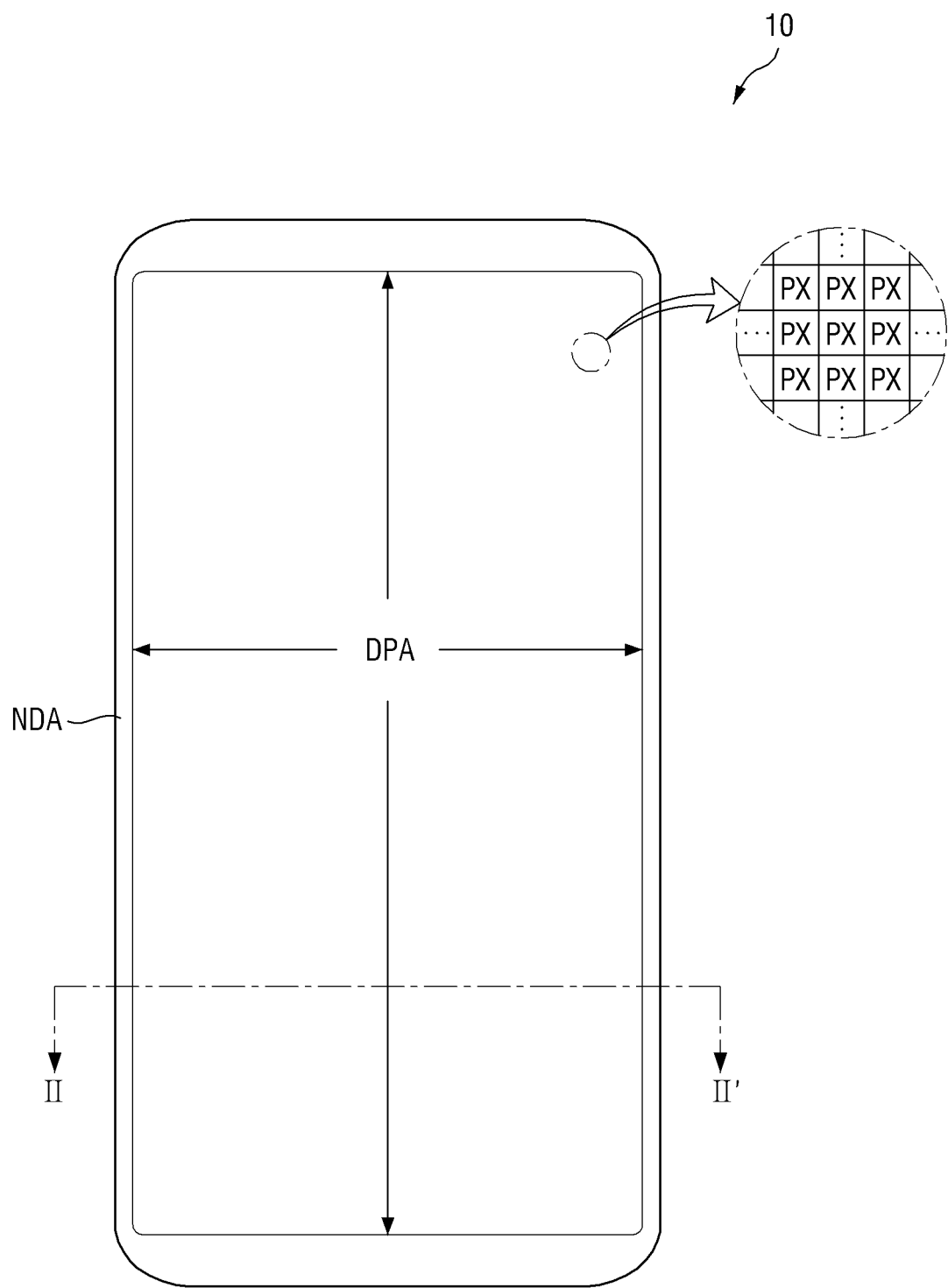
FIG. 1 is a plan view of a display device according to an embodiment.

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

Some of the parts which are not associated with the description may not be provided in order to describe embodiments of the disclosure and like reference numerals refer to like elements throughout the specification.

As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

The terms "and" and "or" may be used in the conjunctive or disjunctive sense and may be understood to be equivalent to "and/or." In the specification and the claims, the phrase "at least one of" is intended to include the meaning of "at least one selected from the group of" for the purpose of its meaning and interpretation. For example, "at least one of A and B" may be understood to mean "A, B, or A and B."

It will be understood that although the terms "first," "second," etc. may be used herein to describe various components, these components should not be limited by these terms. These components are only used to distinguish one component from another. For example, a first element referred to as a first element in one embodiment may be referred to as a second element in another embodiment without departing from the scope of the appended claims. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

As used herein, the singular forms "a," "an" and "the" are intended to include the plural forms as well, unless the context clearly indicates otherwise.

It will be further understood that the terms "comprises" and/or "comprising" "includes" and/or "including", "have" and/or "having" are used in this specification, they or it may specify the presence of stated features, integers, steps, operations, elements and/or components, but do not preclude the presence or addition of other features, integers, steps, operations, elements, components, and/or any combination thereof.

When a layer, film, region, substrate, or area, or element is referred to as being "on" another layer, film, region, substrate, or area, or element, it may be directly on the other film, region, substrate, or area, or element, or intervening films, regions, substrates, or areas, or elements may be present therebetween. Conversely, when a layer, film, region, substrate, or area, or element, is referred to as being "directly on" another layer, film, region, substrate, or area, or element, intervening layers, films, regions, substrates, or areas, may be absent therebetween. Further when a layer, film, region, substrate, or area, or element, is referred to as being "below" another layer, film, region, substrate, or area, or element, it may be directly below the other layer, film, region, substrate, or area, or element, or intervening layers, films, regions, substrates, or areas, or elements, may be present therebetween. Conversely, when a layer, film, region, substrate, or area, or element, is referred to as being "directly below" another layer, film, region, substrate, or area, or element, intervening layers, films, regions, substrates, or areas, or elements may be absent therebetween. Further, "over" or "on" may include positioning on or below an object and does not necessarily imply a direction based upon gravity.

The spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations Sizes of components in the drawings may be exaggerated for convenience of explanation. In other words, since sizes and thicknesses of components in the drawings are arbitrarily illustrated for convenience of explanation, the following embodiments are not limited thereto.

Additionally, the terms "overlap" or "overlapped" mean that a first object may be above or below or to a side of a second object, and vice versa. Additionally, the term "overlap" may include layer, stack, face or facing, extending over, covering or partly covering or any other suitable term as would be appreciated and understood by those of ordinary skill in the art. The terms "face" and "facing" mean that a first element may directly or indirectly oppose a second element. In a case in which a third element intervenes between the first and second element, the first and second element may be understood as being indirectly opposed to one another, although still facing each other. When an element is described as 'not overlapping' or 'to not overlap' another element, this may include that the elements are spaced apart from each other, offset from each other, or set aside from each other or any other suitable term as would be appreciated and understood by those of ordinary skill in the art.

In the specification, an expression such as "A and/or B" indicates A, B, or A and B. Also, an expression such as "at least one of A and B" indicates A, B, or A and B.

In embodiments below, when a component is referred to as being "on a plane," it is understood that a component is viewed from the top, and when a component is referred to as being "on a schematic cross section," it is understood that the component is vertically cut and viewed from the side.

It will be understood that when a layer, region, or component is referred to as being "connected" or "coupled" to another layer, region, or component, it may be "directly connected" or "directly coupled" to the other layer, region, or component and/or may be "indirectly connected" or "indirectly coupled" to the other layer, region, or component with other layers, regions, or components interposed therebetween. For example, it will be understood that when a layer, region, or component is referred to as being "electrically connected" or "electrically coupled" to another layer, region, or component, it may be "directly electrically connected" or "directly electrically coupled" to the other layer, region, or component and may be "indirectly electrically connected" or "indirectly electrically coupled" to the other layer, region, or component with other layers, regions, or components interposed therebetween.

Also, when an element is referred to as being "in contact" or "contacted" or the like to another element, the element may be in "electrical contact" or in "physical contact" with another element; or in "indirect contact" or in "direct contact" with another element.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

In the following examples, the x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that may not be perpendicular to one another.

Unless otherwise defined, all terms (including technical and scientific terms) used herein have the same meaning as commonly understood by one of ordinary skill in the art to which embodiments pertain. In addition, it will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, embodiments will be described in detail with reference to the accompanying drawings.

FIG. 1 is a plan view of a display device according to an embodiment.

Referring to FIG. 1, a display device 10 may display a screen or an image through a display area DPA, and various devices including the display area DPA may be included therein. Examples of the display device 10 may include, but are not limited to, a smartphone, a mobile phone, a tablet PC, a personal digital assistant (PDA), a portable multimedia player (PMP), a television, a game machine, a wristwatch-type electronic device, a head-mounted display, a monitor of a personal computer, a laptop computer, a vehicle or other navigation system, a vehicle's dashboard, a digital camera, a camcorder, an external billboard, an electronic billboard, various medical devices, various inspection devices, various household appliances such as a refrigerator and/or a washing machine including the display area DPA, an Internet-of-Things device, and the like within the spirit and the scope of the disclosure.

The display device 10 may include the display area DPA and a non-display area NDA. The display area DPA is an area where a screen may be displayed, and the non-display area NDA is an area where a screen may not be displayed.

In the display area DPA, pixels PX may be disposed. The pixel PX may be a basic unit that may display a screen. The pixels PX may include, but are not limited to, a red pixel, a green pixel, and a blue pixel. The pixels PX may be alternately arranged or disposed in a plan view. For example, the pixels PX may be arranged or disposed in a matrix, but the disclosure is not limited thereto.

The non-display area NDA may be disposed around the display area DPA. The non-display area NDA may be disposed around the display area DPA and may surround or may be adjacent to the display area DPA. In an embodiment, the display area DPA may be formed in a substantially rectangular shape, and the non-display area NDA may be disposed around or may be adjacent to four sides of the display area DPA, but the disclosure is not limited thereto.

Figure 2:
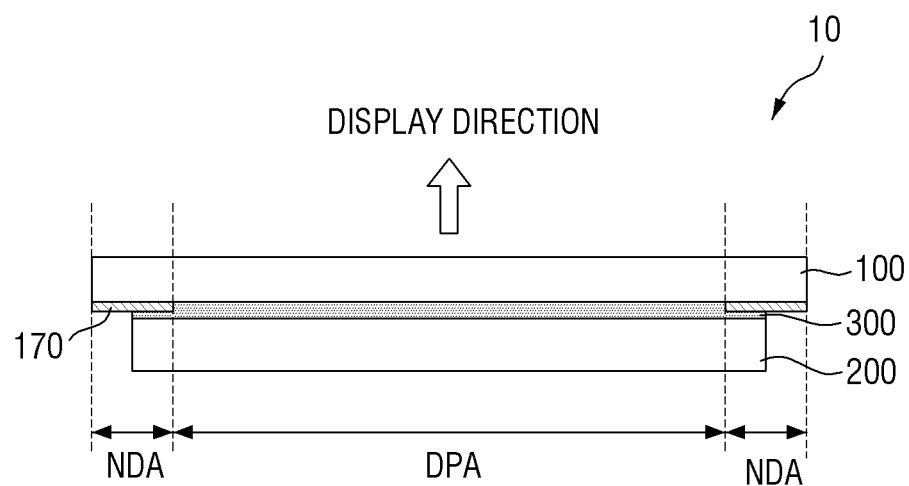
FIG. 2 is a schematic cross-sectional view taken along line II-II' of FIG. 1.

FIG. 2 is a schematic cross-sectional view taken along line II-IP of FIG. 1.

Referring to FIG. 2, a display device 10 may include a display panel 200, a protection member 100 for display disposed on a display surface of the display panel 200, and a printed layer 170 disposed on the protection member 100 for display.

Examples of the display panel 200 may include not only a self-luminous display panel such as an organic light emitting display (OLED) panel, an inorganic electroluminescence (EL) display panel, a quantum dot (QED) display panel, a micro-LED display panel, a nano-LED display panel, a plasma display panel (PDP), a field emission display (FED) panel and a cathode ray tube (CRT) display panel, but also a light receiving display panel such as a liquid crystal display (LCD) panel and an electrophoretic display (EPD) panel.

The protection member 100 for display may be disposed above the display surface of the display panel 200. Here, the display surface of the display panel 200 may refer to a surface between a surface and another surface of the display panel 200, from which light may be emitted to perform image display thereon. In the cases of a transmissive display device 10 or a double-sided display device 10 which may perform display on both surfaces, both surfaces may become display surfaces. The protection member 100 for display may be disposed at any one of both surfaces or both surfaces.

The protection member 100 for display may be referred to as a window, a protection glass, a protection film, a cover member, a cover glass, a cover film, a cover sheet, or the like within the spirit and the scope of the disclosure. Hereinafter, for convenience of description, the protection member 100 for display will be abbreviated as the protection member 100.

The protection member 100 may have a larger area than the display panel 200. The display panel 200 may completely overlap the protection member 100 in the thickness direction. Side surfaces of the protection member 100 may protrude outward from side surfaces of the display panel 200. The protection member 100 may protrude from all sides of the display panel 200. For example, in a case that the display panel 200 may have a substantially rectangular shape, the protection member 100 may protrude from both long sides and both short sides of the display panel 200. A distance that the protection member 100 may protrude from an adjacent side of the display panel 200 may be different for each side or may be the same.

The protection member 100 may be attached or disposed on the display panel 200 through a transparent layer 300 such as an optically clear adhesive (OCA) or optically clear resin (OCR).

The printed layer 170 may be disposed on a bottom surface of the protection member 100. The printed layer 170 may be disposed in the non-display area NDA. The printed layer 170 may be disposed on an edge area of the protection member 100 as an edge coating layer. The printed layer 170 may be at least one of a decorative layer that may impart an aesthetic appeal or an outermost black matrix layer. The printed layer 170 may distinguish the display area DPA and the non-display area NDA. For example, an inner side of the printed layer 170 may be a boundary between the display area DPA and the non-display area NDA. An outer side of the printed layer 170 may be aligned with the side surface of the protection member 100, but the disclosure is not limited thereto. The outer side of the printed layer 170 may be located or disposed more inward than the side surface of the protection member 100. The display panel 200 may overlap at least a portion or a region of the printed layer 170 in the thickness direction.

The printed layer 170 may be disposed on the surface of the protection member 100, but may also be disposed inside the protection member 100. As will be described later, the protection member 100 may include several layers. Not only the outermost layer, but an intermediate layer may also be selected as a layer on which the printed layer 170 may be coated.

Although not illustrated in the drawings, the display device 10 may include a touch member. The touch member may be formed as a separate panel or film to be disposed between the display panel 200 and the protection member 100, to be directly formed or disposed on the display panel 200, or to be formed or disposed inside the display panel 200.

Hereinafter, the above-described protection member 100 will be described in more detail.

Figure 3:
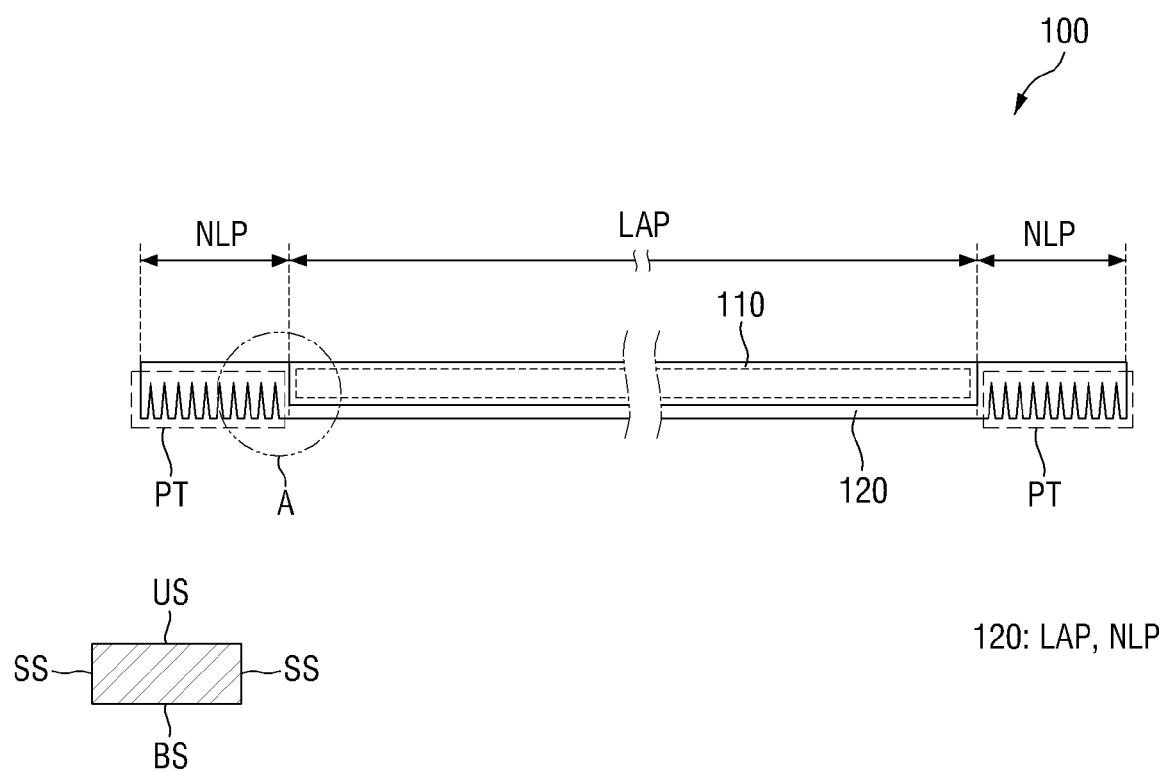
FIG. 3 is a schematic cross-sectional view of a protection member according to an embodiment.
Figure 4:
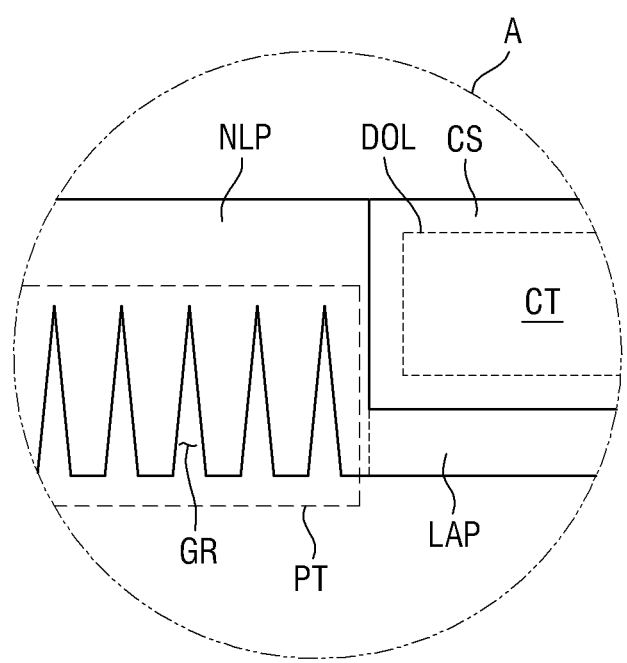
FIG. 4 is an enlarged view of region A of FIG. 3.
Figure 5:
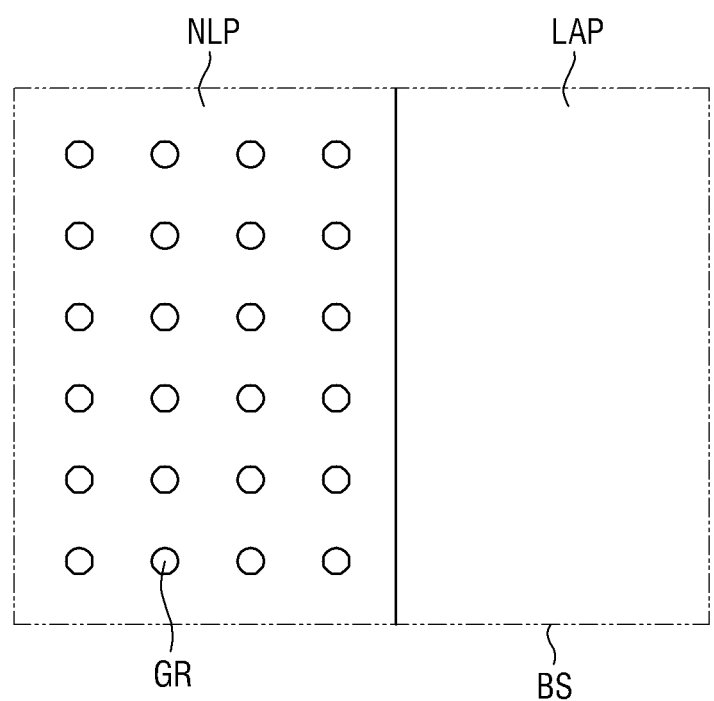
FIG. 5 is an enlarged view of a vicinity of a boundary between a substrate overlapping portion and an outer protruding portion of the protection member according to an embodiment, when viewed from below.

FIG. 3 is a schematic cross-sectional view of a protection member according to an embodiment. FIG. 4 is an enlarged view of region A of FIG. 3. FIG. 5 is an enlarged view of a vicinity of a boundary between a substrate overlapping portion and an outer protruding portion of the protection member according to an embodiment, when viewed from below.

Referring to FIGS. 3 to 5, the protection member 100 may include a glass substrate 110 and a functional coating layer 120 disposed on the glass substrate 110.

The glass substrate 110 may have a plate-like sheet shape having a predetermined thickness. The glass substrate 110 may have a planar shape may be substantially similar to a planar shape of the display device 10 to which the protection member 100 may be applied. In a case that the display device 10 has a substantially rectangular shape, the planar shape of the glass substrate 110 may also be substantially rectangular.

The glass substrate 110 may include a first surface (or one surface), a second surface (or another surface) and side surfaces SS connecting or coupling the first surface and the second surface. The first surface and the second surface may face each other in the thickness direction. Hereinafter, for convenience of description, a first surface of each component of the protection member 100 may be a surface positioned toward a display direction and may be referred to as a "top surface US," and a second surface of each component of the protection member 100 may be a surface facing the display panel 200, and may be referred to as a "bottom surface BS."

The glass substrate 110 may include ultra thin glass (UTG) or thin glass. As the glass substrate 110 is formed of an ultra thin film or a thin film, the glass substrate 110 may have a flexible property. For example, the glass substrate 110 may be bent, folded, or rolled. The thickness of the glass substrate 110 may be in a range of about 10 μm to about 300 μm, for example. In an embodiment, the glass substrate 110 having a thickness in a range of about 30 μm to about 80 μm or a thickness of about 50 μm may be applied.

The glass substrate 110 may include soda-lime glass, alkali aluminosilicate glass, borosilicate glass, or lithium alumina silicate glass.

The glass substrate 110 may include chemically strengthened or thermally strengthened glass to have strong rigidity. Chemical strengthening may be achieved through an ion exchange process in alkaline salts. The ion exchange process may be performed two or more times. However, the disclosure is not limited thereto and the above are merely examples of the chemical strengthening and ion exchange process.

The strengthened glass substrate 110 may have a stress profile in a depth direction from the surface. For example, the glass substrate 110 may include a compression region CS of the surface and a tensile region CT therein. In the strengthened glass substrate 110, the stress may be generally the largest at the surface and decrease toward the inside. At the boundary between the compression region CS and the tensile region CT, a compression depth DOL, which may be a point where stress may be balanced, is defined.

The glass substrate 110 may be obtained by strengthening after cutting of the glass in a mother substrate into cell units. The glass strengthening process may form a compression region CS near or adjacent to the surface. For example, during the ion exchange process, alkali salts and ions of the glass may be exchanged at the surface, and the exchanged ions may diffuse into the glass to form the compression region CS having a predetermined depth DOL. However, in a case that the ion exchange process is performed in a state where the glass substrate 110 is cut into cell units, ion exchange may be performed through the side surfaces SS as well as the top surface US and the bottom surface BS of the glass substrate 110. Therefore, the compression region CS may be formed not only near or adjacent to the top surface US and the bottom surface BS of the glass substrate 110 but also near or adjacent to the side surfaces SS of the glass substrate 110.

As the compression region CS is formed near or adjacent to the surface of the glass substrate 110, the surface of the glass substrate 110 may not be easily scratched. For example, the surface of the glass substrate 110 may have excellent scratch resistance.

The functional coating layer 120 may be disposed on the side surfaces SS and the bottom surface BS of the glass substrate 110. While the functional coating layer 120 protects the glass substrate 110, it may serve to prevent or lessen scattering in a case that the glass substrate 110 is broken, thereby reducing the risk of a stab or the like within the spirit and the scope of the disclosure. The functional coating layer 120 may serve to prevent direct impact applied on the glass substrate 110 in a cutting process for alignment. The functional coating layer 120 may have an impact absorbing function to alleviate impact applied from the outside. This will be described in detail later.

In an embodiment, the functional coating layer 120 may be directly formed or disposed on the side surfaces SS and the bottom surface BS of the glass substrate 110. The functional coating layer 120 may contact the side surfaces SS and the bottom surface BS of the glass substrate 110. For example, the side surfaces SS and the bottom surface BS of the glass substrate 110 may be covered or overlapped by the functional coating layer 120. In an embodiment, all regions of the side surfaces SS and the bottom surface BS of the glass substrate 110 may be covered or overlapped by the functional coating layer 120.

The top surface US of the glass substrate 110 may be exposed without being covered or overlapped by the functional coating layer 120. The exposed top surface US of the glass substrate 110 may be an outer surface of the display device 10 positioned toward the display direction. In an embodiment, since the glass substrate 110, which may have a greater strength than a film, forms the top surface US of the protection member 100, it may have excellent scratch resistance.

The functional coating layer 120 may be divided into a substrate overlapping portion LAP and an outer protruding portion NLP depending on whether the functional coating layer 120 may overlap the glass substrate 110 or not in the thickness direction. The substrate overlapping portion LAP may be a portion or a region located or disposed on the bottom surface BS of the glass substrate 110 to overlap the glass substrate 110. The thickness of the substrate overlapping portion LAP may be smaller than that of the glass substrate 110. For example, the thickness of the substrate overlapping portion LAP may be in a range of about 0.5 μm to about 10 μm.

The outer protruding portion NLP may be a portion that may protrude outward from the side surface SS of the glass substrate 110. The thickness of the outer protruding portion NLP may be greater than that of the substrate overlapping portion LAP. The thickness of the outer protruding portion NLP may be substantially equal to the sum of the thickness of the substrate overlapping portion LAP and the thickness of the glass substrate 110 overlapping it. For example, even in a case that an impact absorbing pattern PT, which will be described later, may be disposed in the outer protruding portion NLP and may include grooves GR, the thickness of the impact absorbing pattern PT of the functional coating layer 120 present between the grooves GR may be substantially equal to the sum of the thickness of the substrate overlapping portion LAP and the thickness of the glass substrate 110 overlapping it.

The outer protruding portion NLP may include the impact absorbing pattern PT. The impact absorbing pattern PT may perform a function of alleviating impact applied from the outside. The impact absorbing pattern PT may be formed to be positioned or disposed over the entire area of the outer protruding portion NLP of the functional coating layer 120. The impact absorbing pattern PT provided with the grooves GR may overlap the entire area of the outer protruding portion NLP of the functional coating layer 120. For example, the grooves GR of the impact absorbing pattern PT may be arranged or disposed over the entire area of the outer protruding portion NLP of the functional coating layer 120. The grooves GR may not overlap the glass substrate 110 in the thickness direction.

The impact absorbing pattern PT may include the grooves GR recessed from the bottom surface of the outer protruding portion NLP of the functional coating layer 120 toward the top surface of the outer protruding portion NLP. For example, at least one of the top surface US or the bottom surface BS of the outer protruding portion NLP may partially or entirely include an uneven surface. The impact absorbing pattern PT positioned in the outer protruding portion NLP of the functional coating layer 120 may include the grooves GR which may be surrounded by the functional coating layer 120 to be arranged or disposed in the bottom surface of the outer protruding portion NLP of the functional coating layer 120. However, the disclosure is not limited thereto, and the grooves GR of the impact absorbing pattern PT may be arranged or disposed in the top surface of the outer protruding portion NLP to be formed in a shape recessed from the top surface toward the bottom surface of the outer protruding portion NLP. The inside of the groove GR of the impact absorbing pattern PT may be an empty space. However, the disclosure is not limited thereto, and the inside of the groove GR may be filled with a material that may absorb and alleviate the impact applied from the outside.

Although the groove GR of the impact absorbing pattern PT is illustrated to have a substantially triangular cross section, the shape of the groove GR is not limited thereto and may be formed in various shapes. For example, the groove GR may be formed in a substantially rectangular shape or a substantially round shape concave toward the top surface from the bottom surface.

As the outer protruding portion NLP may include the impact absorbing pattern PT, it may be possible to alleviate the impact applied from the outside, thereby preventing or suppressing the glass substrate 110 from being broken. In detail, the outer protruding portion NLP of the functional coating layer 120 may cover or overlap side surfaces of the glass substrate 110, and the impact from the outside of the protection member 100, for example, the impact from the side thereof may be first applied to the functional coating layer 120, without being applied directly to the glass substrate 110. Since the impact absorbing pattern PT including the grooves GR, which may have empty spaces or may be filled with an impact absorbing material, may reduce the impact applied from the outside, it may be possible to prevent or suppress the glass substrate 110 from being broken due to an external impact.

The top surface US of the functional coating layer 120 and the top surface US of the glass substrate 110 may be in contact with each other without a step. In an embodiment, the top surface US of the functional coating layer 120 may be at the same level as the top surface US of the glass substrate 110, and may substantially be on the same plane as the top surface US of the glass substrate 110. Alternatively, the top surface US of the functional coating layer 120 may be on an extension surface of the top surface US of the glass substrate 110. The bottom surface BS of the functional coating layer 120 may be substantially parallel to at least one of the top surface US of the functional coating layer 120 or the top surface US of the glass substrate 110. The bottom surface BS of the functional coating layer 120 may be substantially parallel to the bottom surface BS of the glass substrate 110.

An outer side surface SS (or a side surface) of the functional coating layer 120 may connect or couple the top surface US and the bottom surface BS of the functional coating layer 120. The outer side surface SS of the functional coating layer 120 may connect or couple the top surface US and the bottom surface BS of the outer protruding portion NLP.

The outer side surface SS of the functional coating layer 120 may be placed or disposed on the same plane as the thickness direction. For example, the outer side surface SS of the functional coating layer 120 may be substantially perpendicular to the bottom surface BS of the glass substrate 110 (or the bottom surface BS of the functional coating layer 120) and the top surface US of the functional coating layer 120. The outer side surface SS of the functional coating layer 120 may be substantially perpendicular to the top surface US of the glass substrate 110. The outer side surface SS of the functional coating layer 120 and the side surface SS of the glass substrate 110 facing it may be substantially parallel, but the disclosure is not limited thereto. The width of the functional coating layer 120 protruding from the side surface SS of the glass substrate 110 may be in a range of about 1 μm to about 100 μm, but the disclosure is not limited thereto. The outer side surface SS of the functional coating layer 120 may be a cut surface (see 'CTL' of FIG. 11) obtained by a laser cutting process. For example, the outer side surface SS of the functional coating layer 120 may be, for example, a laser cut surface.

The functional coating layer 120 may include a resin. For example, the functional coating layer 120 may include at least one of epoxy acrylate resin, polyester acrylate resin, polyether acrylate resin, urethane acrylate resin, acrylic acrylate resin, unsaturated polyester, urethane resin, acrylonitrile-butadiene-styrene (ABS) resin or rubber. In an embodiment, the functional coating layer 120 may be formed of an organic-inorganic hybrid material.

The printed layer 170 may be disposed on the bottom surface BS of the functional coating layer 120. The printed layer 170 may be aligned with the outer side surface SS of the functional coating layer 120 and may cover or overlap the outer protruding portion NLP of the functional coating layer 120 while extending inwardly to partially overlap the substrate overlapping portion LAP of the functional coating layer 120.

As described above, the side surfaces SS of the glass substrate 110 according to an embodiment may not be directly exposed to the outside but may be covered or overlapped by the functional coating layer 120 to be protected. The side surface SS of the protection member 100 may be formed of the side surface SS of the functional coating layer 120, but may not be formed of the side surface SS of the glass substrate 110. Therefore, the side surface SS of the protection member 100 may not have an additional protruding structure, and thus assembly tolerance may be minimized. A detailed description thereof will be described later in an embodiment of FIG. 6.

Meanwhile, although not illustrated in the drawings, the protection member 100 of FIG. 3 may be laminated in two or more layers. In each of the two or more laminated protection members 100, the glass substrate 110 and the functional coating layer 120 may be at the same position in the thickness direction. In the two or more laminated protection members 100, the glass substrate 110 and the functional coating layer 120 may be sequentially repeated in the thickness direction. However, the disclosure is not limited thereto, and in some or a predetermined number of the protection members 100, the glass substrate 110 and the functional coating layer 120 may be laminated such that positions thereof may be switched in the thickness direction. For example, in the state where the two or more protection members 100 may be laminated, some or a predetermined number of the protection members 100 may include the glass substrates 110 in direct contact with each other, or the functional coating layers 120 in direct contact with each other. For example, the number of the protection members 100 to be laminated is not limited, and some or a predetermined number of the protection members 100 may be laminated such that the top surface US and the bottom surface BS may be turned over in the drawings.

The protection member 100 may include a front coating layer disposed on the top surface US of the glass substrate 110. The front coating layer may perform one or more of functions such as anti-reflection, anti-fingerprint, an antibacterial function, a blue light blocking function, an electromagnetic wave blocking function, privacy protection and the like within the spirit and the scope of the disclosure. The front coating layer may be wet coated with a fluorine-based coating solution or dry coated by vacuum deposition, but the disclosure is not limited thereto.

Figure 6:
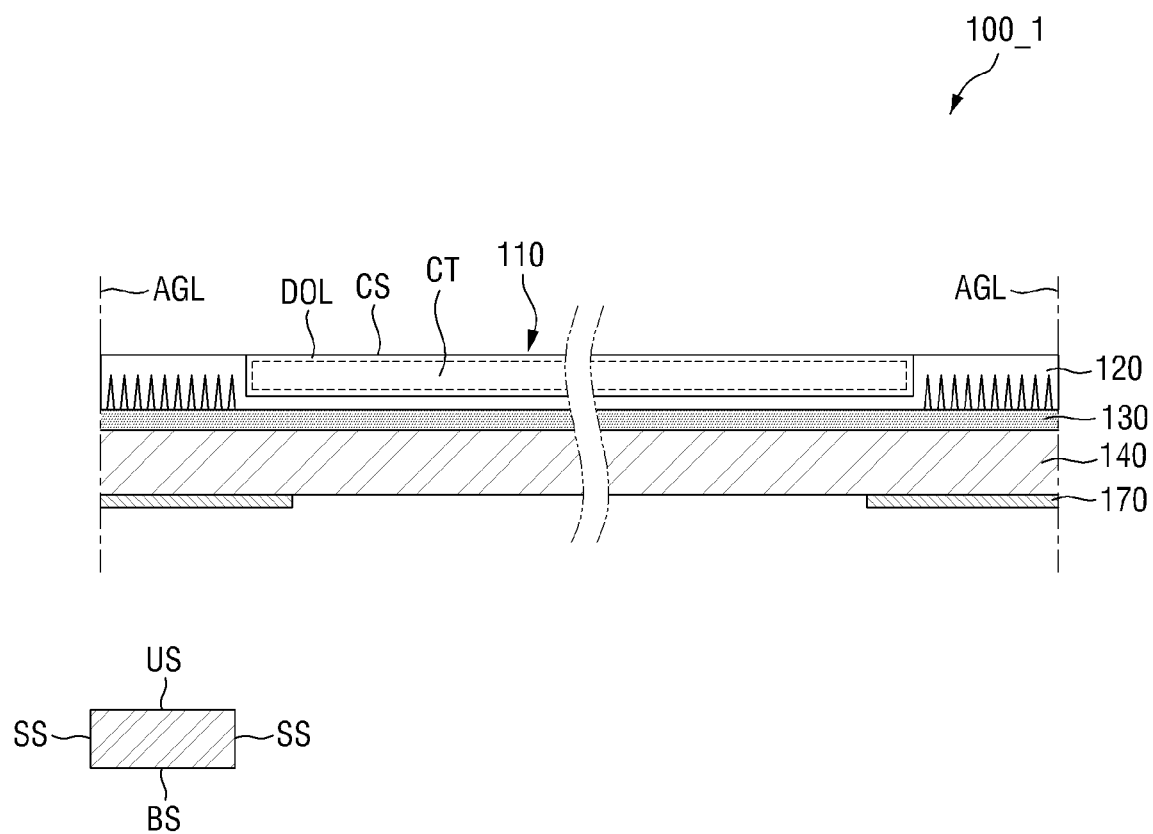
FIG. 6 is a schematic cross-sectional view of a protection member according to an embodiment.

FIG. 6 is a schematic cross-sectional view of a protection member according to an embodiment.

Referring to FIG. 6, a protection member 100_1 according to an embodiment may be different from an embodiment of FIG. 3 in that the protection member 100_1 may include other layers laminated on the bottom surface BS of the functional coating layer 120.

As an example, a bonding layer 130 may be disposed on the bottom surface BS of the functional coating layer 120, and a film layer 140 may be disposed on the bottom surface BS of the bonding layer 130.

The bonding layer 130 may be interposed between the functional coating layer 120 and the film layer 140 to attach the functional coating layer 102 and the film layer 140. The bonding layer 130 may be, for example, a tackifier layer, or may be an adhesive layer. The bonding layer 130 may have an adhesive strength of at least about 500 gram-force per inch (gf/in) under conditions of room temperature of about 25° C. and a humidity of about 50%, thereby preventing at least one of the functional coating layer 120 or the glass substrate 110 from being peeled off from the display panel 200 side. In terms of resisting external impact and ensuring resilience against deformation, the bonding layer 130 may have a storage modulus in a range of about 80 MPa to about 120 MPa under the above conditions. The bonding layer 130 may have a predetermined creep property to relieve stress in a case that being folded or bended, which may be in a range of about 50% to about 800% under the above conditions. The bonding layer 130 may include any one of acrylic resin, silicone resin, epoxy resin, urethane resin, or a combination thereof.

The film layer 140, which may be attached to the bottom surface BS of the glass substrate 110 through the bonding layer 130, may perform a scattering prevention function. For example, in a case that the glass substrate 110 is broken, fragments may get stuck in the film layer 140, thereby preventing the fragments from scattering. The film layer 140 may perform functions, such as an impact alleviation function and the like, other than the scattering prevention function.

In a case that the film layer 140 may include a scattering prevention film, the film layer 140 may contain a transparent polymer resin. The transparent polymer resin forming the film layer 140 may include at least one of polyethylene terephthalate (PET), polyethylene naphthalate (PEN), polyether sulfone (PES), polyimide (PI), polyarylate (PAR), polycarbonate (PC), polymethyl methacrylate (PMMA), or cycloolefin copolymer (COC).

The bonding layer 130 and the film layer 140 have a width larger than the width of the glass substrate 110, and thus may protrude outward from the side surfaces SS of the glass substrate 110. The side surfaces SS of each of the bonding layer 130 and the film layer 140 may be aligned with the side surface SS of the functional coating layer 120. For example, all the side surfaces SS of the functional coating layer 120, the bonding layer 130, and the film layer 140 may be aligned with an alignment plane AGL or an alignment line having a straight linear shape in cross-sectional view. The side surfaces SS of the bonding layer 130 and the film layer 140 may be the cut surface (see 'CTL' of FIG. 11), similar to the side surface SS of the functional coating layer 120 described above.

The protection member 100_1 may include the printed layer 170. An outer side surface SS of the printed layer 170 may also be aligned with the alignment plane AGL, but the disclosure is not limited thereto. In an embodiment of FIG. 6, the printed layer 170 is illustrated to be disposed on the bottom surface BS of the film layer 140, which may be different from an embodiment of FIG. 3. However, the printed layer 170 may be disposed at a different location in the thickness direction. For example, even in the embodiment of FIG. 6, the printed layer 170 may be formed on the bottom surface BS of the functional coating layer 120. The printed layer 170 may be interposed between the functional coating layer 120 and the bonding layer 130. As other examples, the printed layer 170 may be formed or disposed over the top surface US of the functional coating layer 120 and the top surface US of the glass substrate 110, or may be formed or disposed on the top surface US of the film layer 140. The printed layers 170 may be arranged or disposed at different positions in the thickness direction to at least partially overlap each other.

As described above, in the protection member 100_1 according to an embodiment of the laminated structure, in which the glass substrate 110 and the film layer 140 may be attached, the film layer 140 may protrude outward from the side surfaces SS of the glass substrate 110. However, in terms of the protection member 100_1, the side surfaces SS of the functional coating layer 120, the bonding layer 130, and the film layer 140, which may form the side surface SS of the protection member 100_1, may be aligned with each other without protruding. Therefore, in a case that attaching the protection member 100_1 to the display panel 200 to install it in a set (a chassis, a bracket or the like) of the display device 10, the assembly tolerance may be minimized, thereby improving process capability and process efficiency. The glass substrate 110 may be protected by the functional coating layer 120, the bonding layer 130, the film layer 140, and the like, thereby improving the impact resistance and preventing fragments from scattering in a case that the glass substrate 110 is broken.

Although not illustrated in the drawing, the protection member 100_1 of FIG. 6 may include at least one of a plurality of the bonding layers 130 or a plurality of the film layers 140. For example, the bonding layers 130 and the film layers 140 may be disposed under or below the glass substrate 110 and the functional coating layer 120, or one or more bonding layers 130 and one or more film layers 140 may be disposed between the glass substrates 110 and the functional coating layer 120.

A structure, in which the side surface SS and the impact absorbing pattern PT positioned or disposed in the outer protruding portion NLP of the functional coating layer 120 may be aligned without protruding, may be obtained by the cutting process performed after laminating each layer during the fabricating process of the protection member 100_1. Since the cut surface may be located or disposed outside the glass substrate 110 without direct contact therewith, it may be possible to minimize transmission of impact generated during the cutting process to the glass substrate 110.

A crack, which may be likely to occur on the side surface (or the cut surface (see 'CTL' of FIG. 11)) of the functional coating layer 120, may be repaired by a laser sintering method. Accordingly, the impact resistance of the protection member 100 may be enhanced.

Hereinafter, a method of fabricating the protection member will be described by referring to FIGS. 7 to 12.

FIGS. 7 to 11 are schematic cross-sectional views illustrating the steps of the method of fabricating the protection member of FIG. 6. FIG. 12 is a diagram illustrating a process of repairing a crack CR occurring on the functional coating layer according to a repair process of the functional coating layer.

Figure 7:
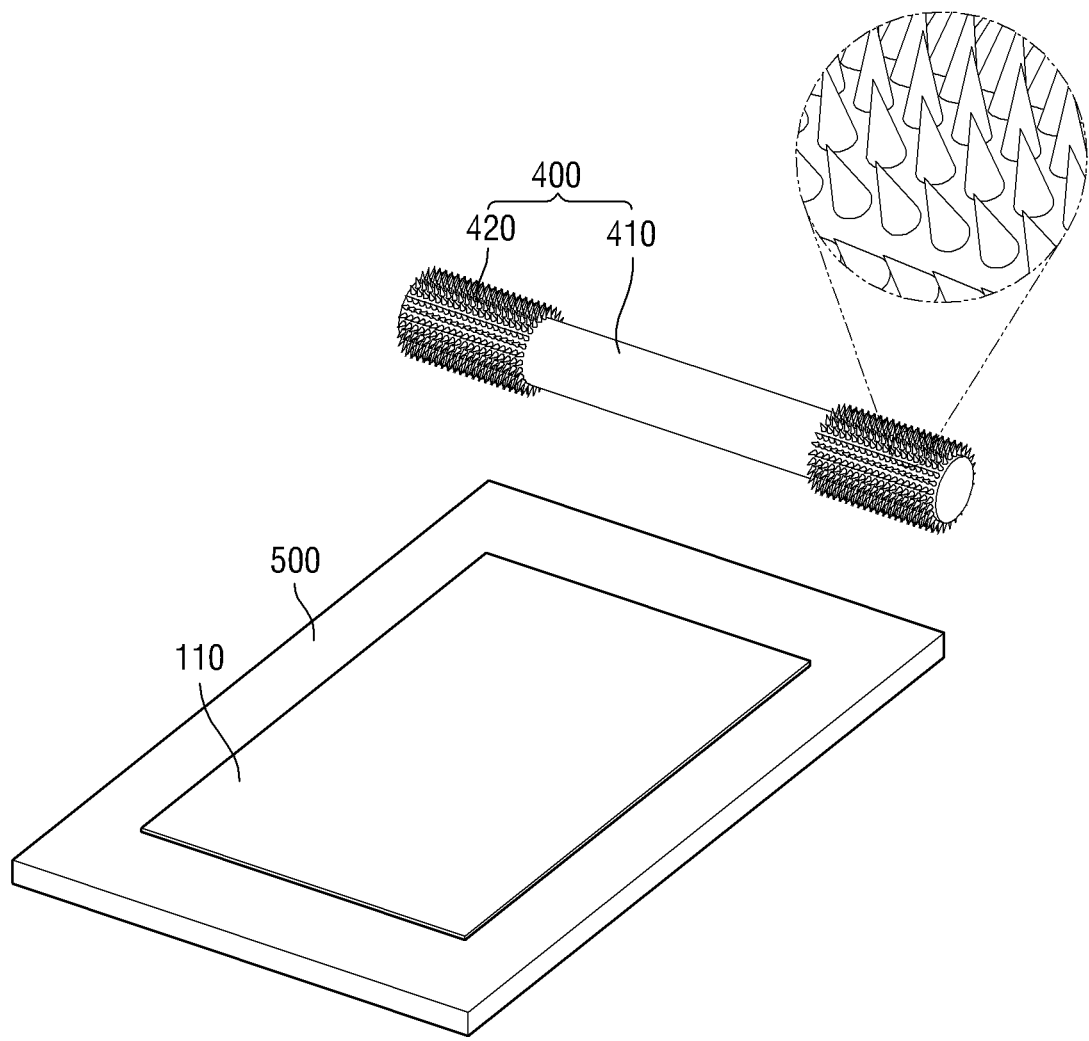
FIGS. 7 to 12 are schematic cross-sectional views illustrating the steps of the method of fabricating the protection member of FIG. 6.
Figure 8:
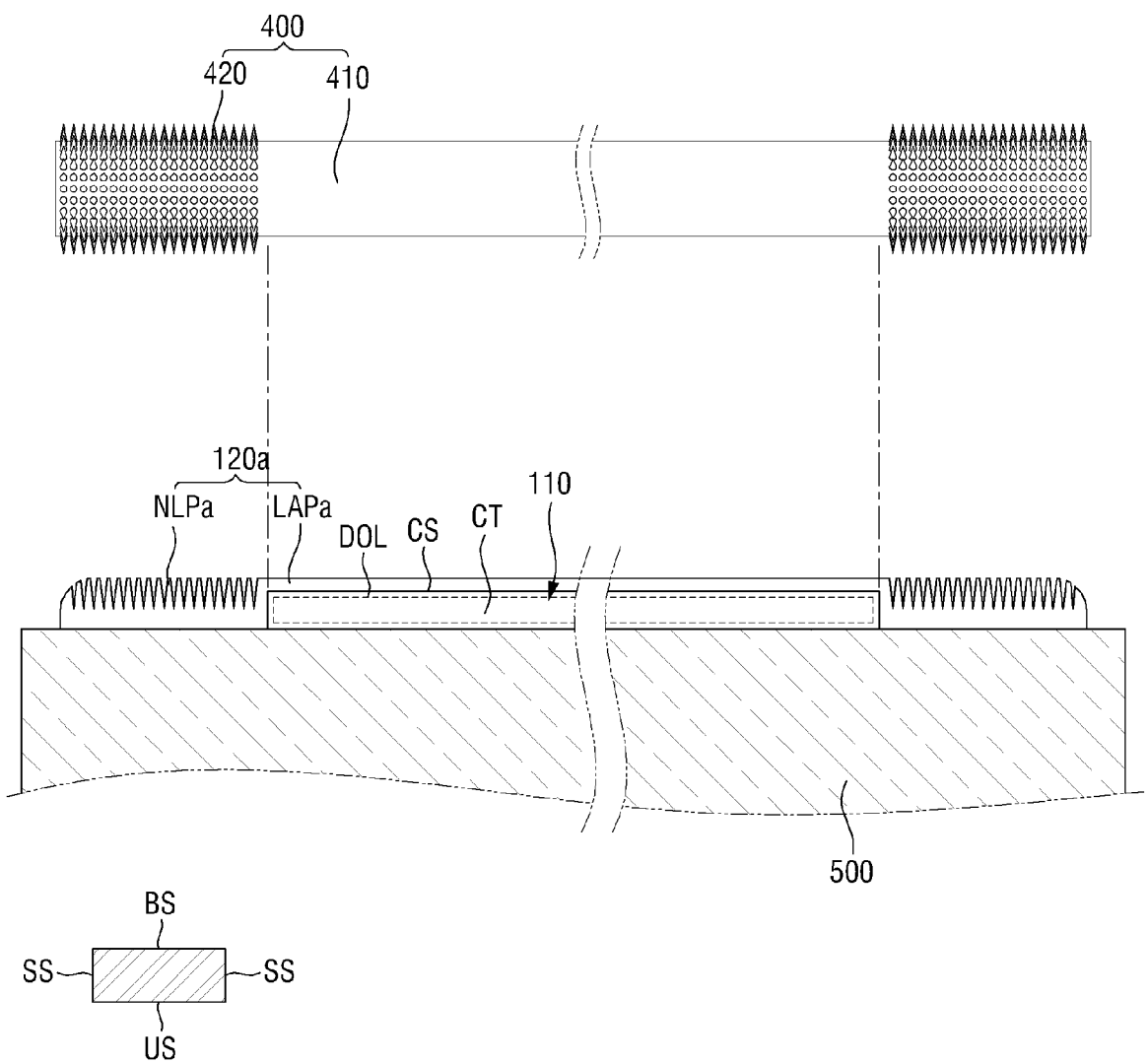

Referring to FIGS. 7 and 8, the glass substrate 110 may be disposed on a stage 500. Subsequently, a functional composition 120*a* may be coated on the bottom surface BS (the surface facing upward in the drawing) of the glass substrate 110. The functional composition 120*a* may include a liquid resin. In the process of fabricating the protection member 100_1 of FIG. 6, a method of coating the functional composition 120*a* may be a glass direct molding (GDM) method, but the method of coating the functional composition 120*a* is not limited thereto. The functional composition 120*a* may be coated by a method such as slit coating, bar coating, spin coating, glass direct printing (GDP), or the like within the spirit and the scope of the disclosure.

In the process of coating the functional composition 120*a*, a bar roller 400 may be used. The bar roller 400 may include a first bar region 410 and second bar regions 420. The first bar region 410 may be a region covered or overlapped by a smooth surface without protrusions, and the second bar region 420 may be a region or regions including protrusions or the like on a surface or surfaces thereof.

The first bar region 410 may be located or disposed between two second bar regions 420. For example, the first bar region 410 may be located or disposed near a center of the bar roller 400, and the second bar regions 420 may be located or disposed near both ends of the bar roller 400. The first bar region 410 may correspond to a substrate overlapping portion LAPa of the functional composition 120*a*, and the second bar regions 420 may correspond to outer protruding portions NLPa of the functional composition 120*a*.

As the functional composition 120*a* is coated by using the bar roller 400, grooves may be formed in the outer protruding portions NLPa of the functional composition 120*a*. As will be described later, the impact absorbing patterns PT may be formed in the outer protruding portions NLP of the functional coating layer 120 by processes of curing and cutting the functional composition 120*a*.

After the functional composition 120*a* is coated on the bottom surface BS of the glass substrate 110, the coated functional composition 120*a* may be cured. The curing process may be performed by thermal curing or ultraviolet curing. The functional coating layer 120 formed by curing may have a flat bottom surface BS (the surface facing upward in the drawing), and may completely cover or overlap the bottom surface BS and the side surfaces SS of the glass substrate 110. The functional composition 120*a* may protrude by a considerable distance from the side surface SS of the glass substrate 110. The outer side surface SS of the functional composition 120*a* of the present step may have an acute angle of inclination, but the disclosure is not limited thereto.

Figure 9:
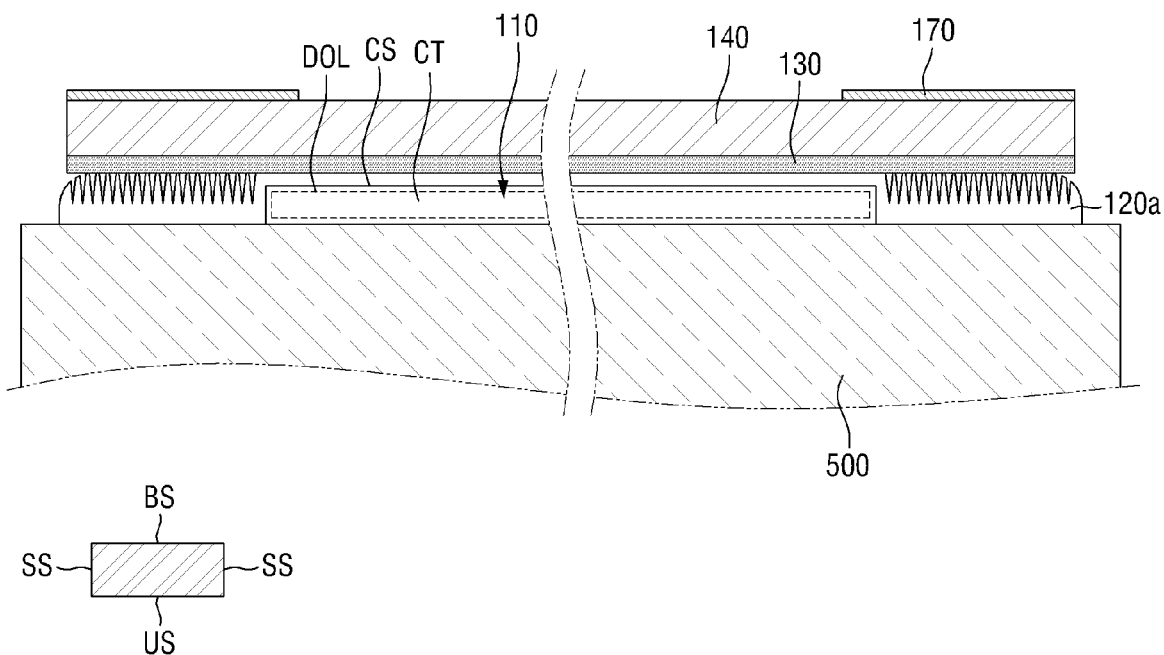

Referring to FIG. 9, the bonding layer 130 and the film layer 140 may be laminated on the bottom surface BS of the functional composition 120*a*. The lamination may be made by laminating, on the functional composition 120*a*, the bonding layer 130 and the film layer 140 which may be previously combined. As an example, the bonding layer 130 may be first coated or laminated on the functional composition 120*a*, and the film layer 140 may be disposed thereon to form the above-described lamination structure. The printed layer 170 may be formed on the film layer 140 after lamination of the film layer 140, or the printed layer 170 may be formed first on the film layer 140, and then the film layer 140 may be laminated, thereby forming the lamination structure as shown in FIG. 6.

The bonding layer 130 and the film layer 140 may both have widths greater than that of the glass substrate 110 to protrude from the side surfaces SS of the glass substrate 110. A positional relationship among the side surfaces SS of the functional composition 120*a*, the bonding layer 130, and the film layer 140 may be variously modified. In the illustrated example, the functional composition 120*a* may protrude most outwardly, and the film layer 140 may protrude more outwardly than the bonding layer 130. However, the side surfaces SS thereof may be aligned with each other, or a protruding relationship may be changed differently from the illustrated example.

Figure 10:
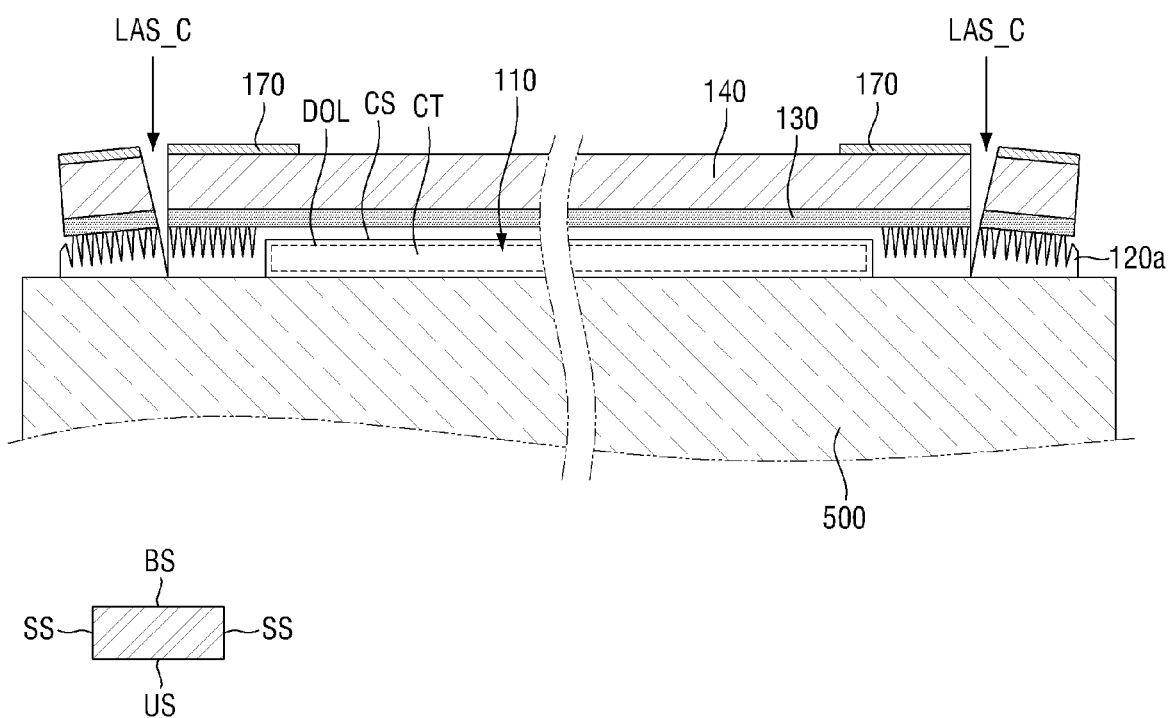

Referring to FIG. 10, the lamination structure of FIG. 9 is cut. A part to be cut may be an edge part of the laminated structure, which may be located or disposed outside the side surfaces SS of the glass substrate 110. In the cutting process, the functional composition 120*a*, the bonding layer 130, and the film layer 140 may be cut together. The functional composition 120*a*, the bonding layer 130, and the film layer 140 may be partially cut, but the glass substrate 110 may not be cut. The cutting may be performed by irradiating a laser LAS_C for cutting. However, the disclosure is not limited thereto, and the cutting may be performed by a knife or other cutting members.

The side surface SS of the cut protection member 100_1 becomes the cut surface (see 'CTL' of FIG. 11) by the cutting process, and the respective layers exposed on the side surface SS may be aligned with each other. Even in a case that the side surface SS of the functional composition 120*a* before cutting may have the acute angle of the inclination, the side surface SS of the functional coating layer 120 completed by cutting may have an angle substantially perpendicular to the top surface US and the bottom surface BS.

In a case that cutting the part of the functional composition 120*a* present outside the glass substrate 110 as in the illustrated example, the impact thus caused may not be directly transmitted to the glass substrate 110. Since the glass substrate 110 is not cut, a compression region CS positioned near or adjacent to the side surface SS of the glass substrate 110 may also be maintained without much change. Therefore, it may be possible to form the protection member 100_1 of which side surfaces SS may be aligned without loss of strength of the glass substrate 110 through the above-described method.

The printed layer 170 may also be cut together in this step, and in this case, the outer side surface SS of the printed layer 170 may also be aligned with the side surfaces SS of the functional coating layer 120, the bonding layer 130, and the film layer 140.

Although not illustrated in the drawings, in the case of fabricating the protection member 100 according to an embodiment of FIG. 3, the step of FIG. 9 may be omitted, and the cutting step may be performed immediately after forming the functional composition 120*a*.

Figure 11:
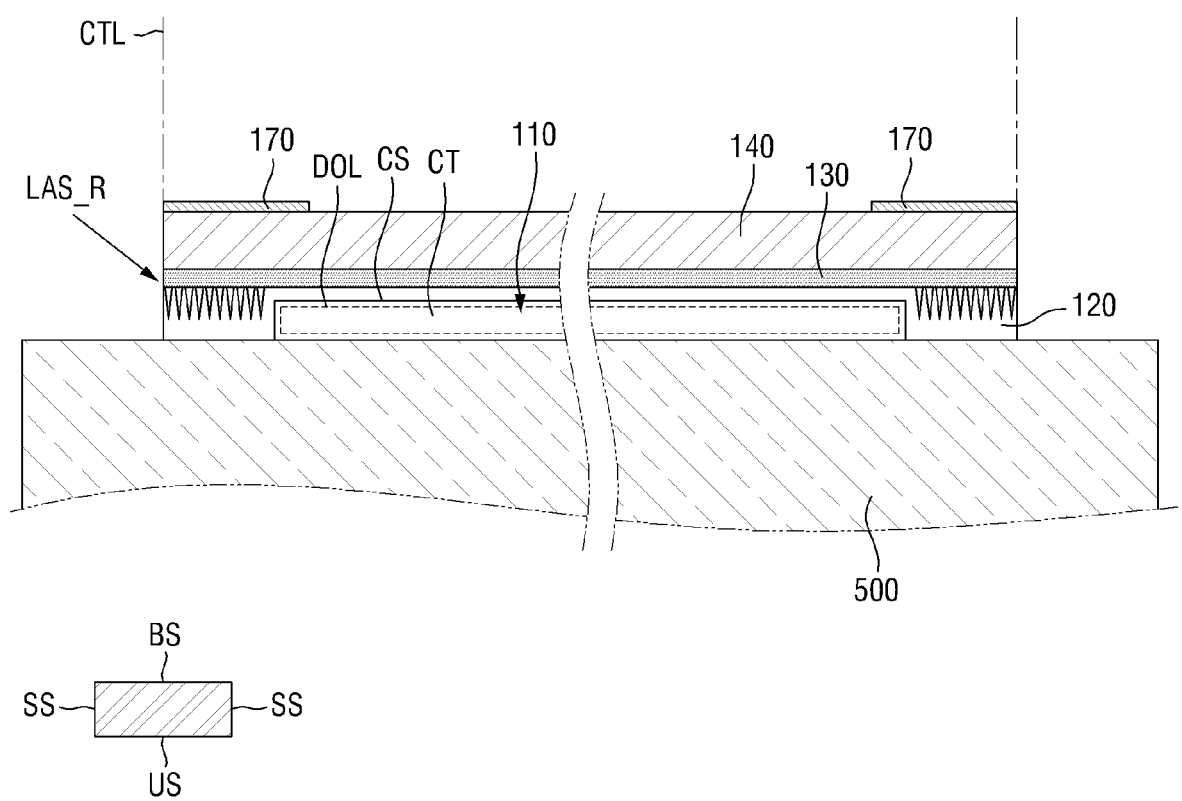
Figure 12:
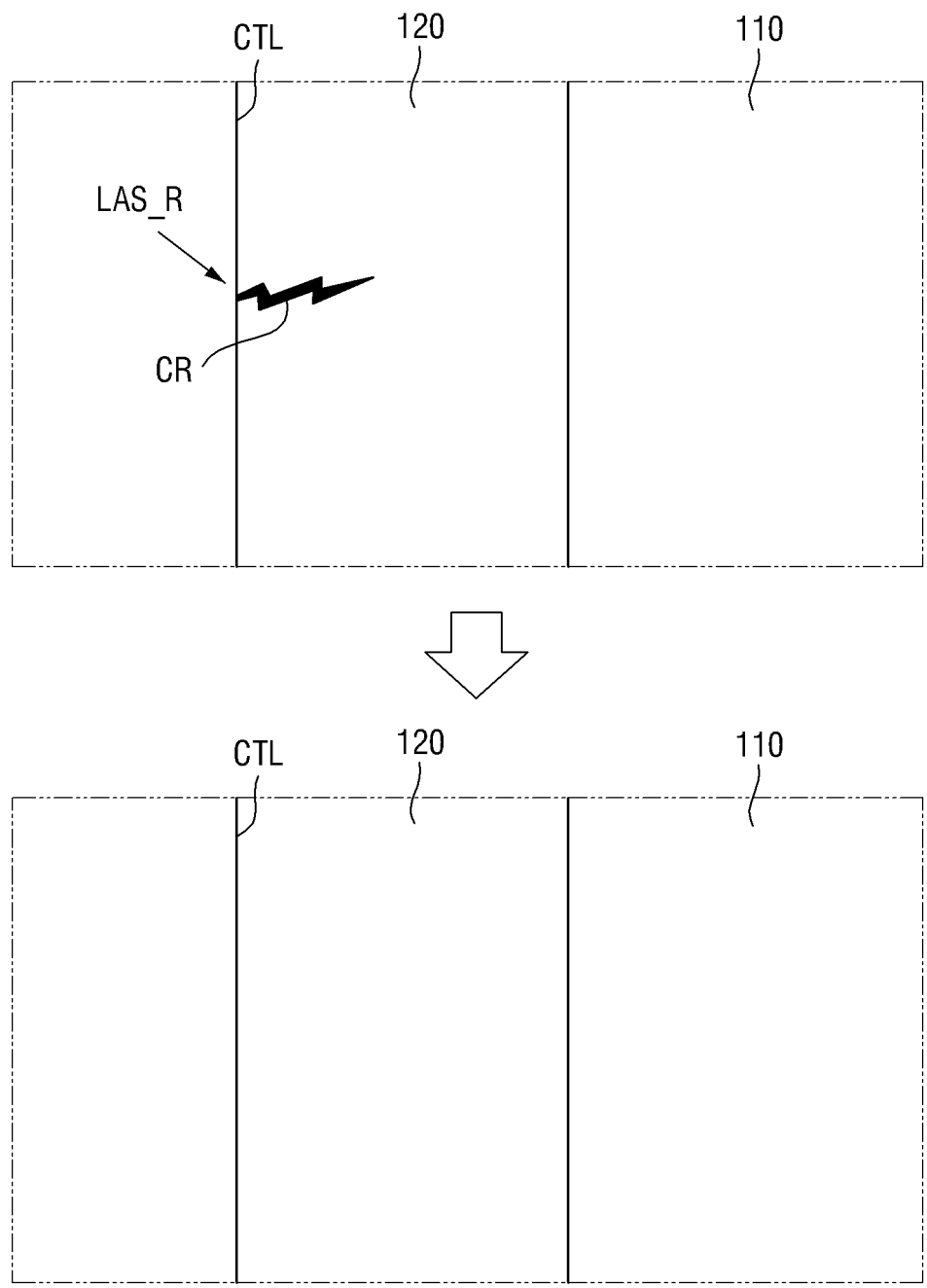

Referring to FIGS. 11 and 12, the cut functional coating layer 120 of FIG. 10 may be repaired through the laser sintering method, thereby completing the protection member 100_1 as shown in FIG. 6.

As an example, a laser LAS_R for repair may be irradiated to the entire area of the cut surface CTL of the functional coating layer 120. In the cut surface CTL of the functional coating layer 120 to which the laser LAS_R for repair has been irradiated, a partial region of the functional coating layer 120 may undergo recrystallization. Accordingly, a crack CR, which may be likely to occur on the cut surface CTL of the functional coating layer 120, may be removed. For example, in a case that the laser LAS_R for repair is irradiated to a partial region in the vicinity of the crack CR occurring on the cut surface CTL of the functional coating layer 120, the partial region may be recrystallized by the laser LAS_R for repair. Accordingly, the crack CR may be removed.

As the crack CR occurring on the cut surface CTL of the functional coating layer 120 is removed, it may be possible to suppress or prevent a decrease in the impact resistance of the protection members 100 and 100_1 which may be caused by the occurrence of the crack CR.

However, the above-described step of repairing the functional coating layer 120 may be omitted, and in this case, the protection member 100_1 as shown in FIG. 6 may be completed by the cutting step for the laminated structure.

Hereinafter, other embodiments of the protection member will be described. In the following embodiments, a description of the same components as those of the above-described embodiment will be omitted or simplified, and differences will be mainly described.

Figure 13:
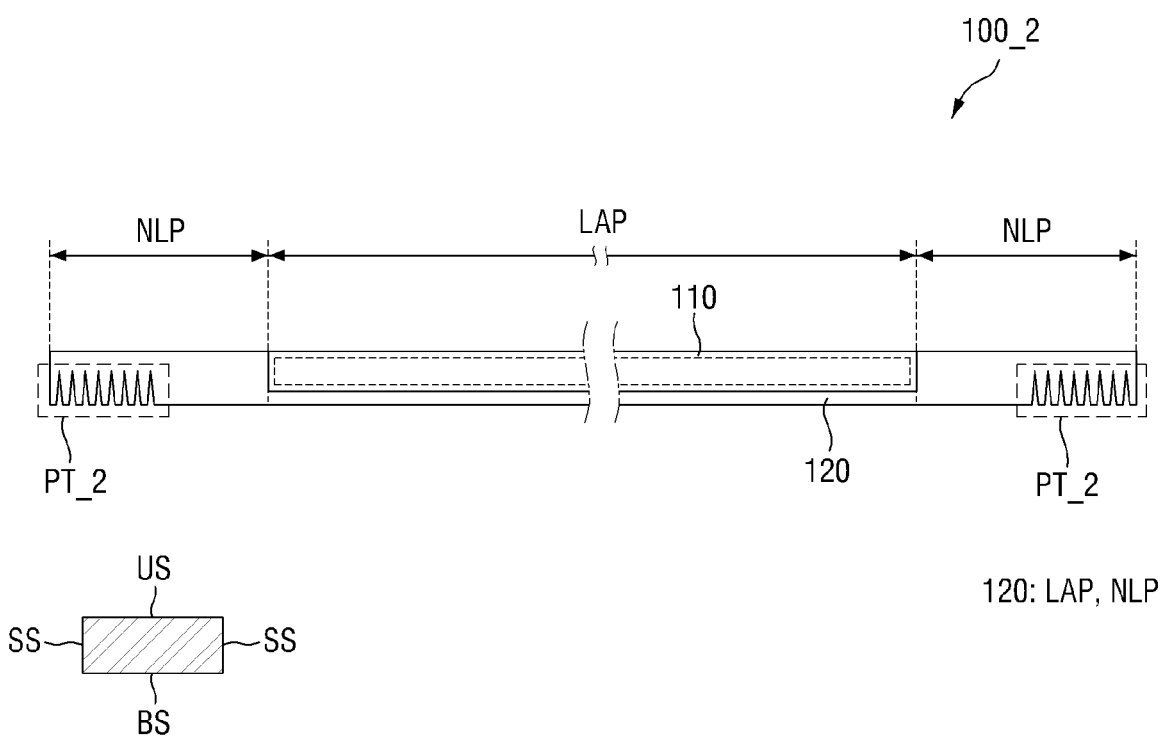
FIG. 13 is a schematic cross-sectional view of a protection member according to an embodiment.

FIG. 13 is a schematic cross-sectional view of a protection member according to an embodiment.

Referring to FIG. 13, an impact absorbing pattern PT_2 of a protection member 100_2 according to an embodiment may be different from an embodiment of FIG. 3 in that the impact absorbing pattern PT_2 may be partially disposed in the outer protruding portion NLP.

As an example, the protection member 100_2 according to an embodiment includes may include the impact absorbing pattern PT_2, which may be partially disposed in the outer protruding portion NLP without being disposed over the entire area of the outer protruding portion NLP. For example, the grooves GR of the impact absorbing pattern PT_2 may be arranged or disposed only in a partial area of the outer protruding portion NLP.

Even in this case, since the outer protruding portion NLP may include the impact absorbing pattern PT_2, the impact applied from the outside, for example, the impact applied from the side of the functional coating layer 120 may be alleviated, and thus it may be possible to prevent or suppress the glass substrate 110 from being damaged or broken due to the external impact.

Figure 14:
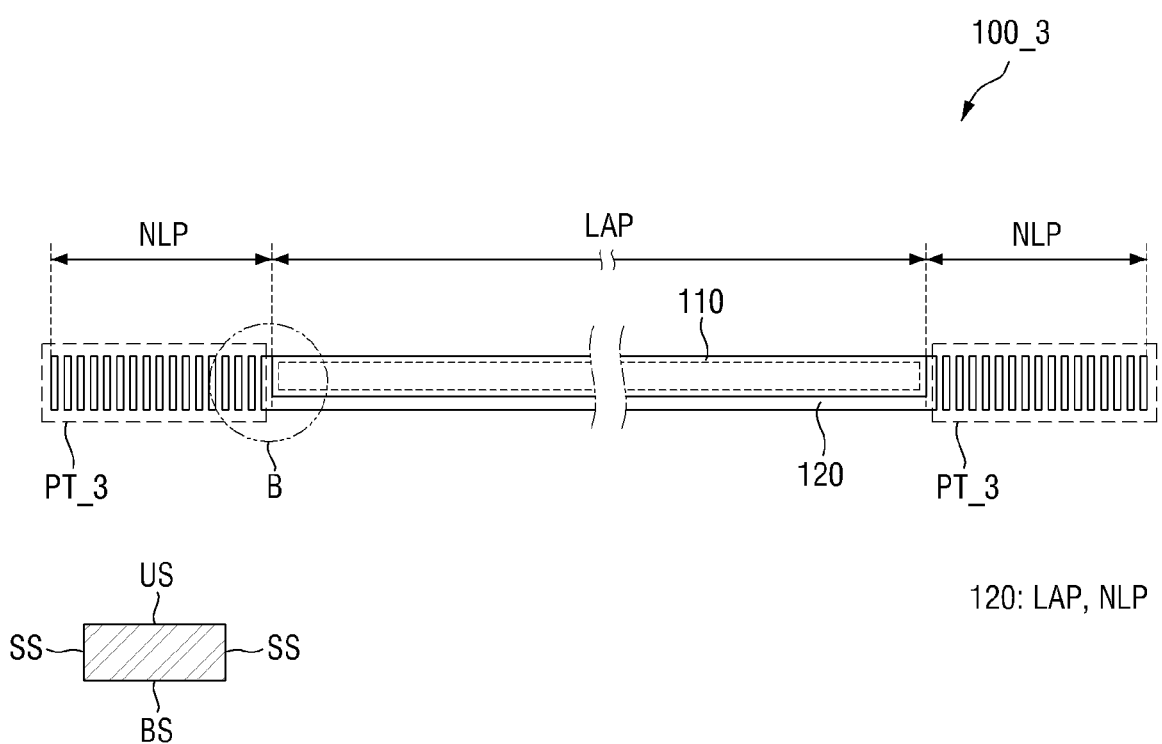
FIG. 14 is a schematic cross-sectional view of a protection member according to an embodiment.
Figure 15:
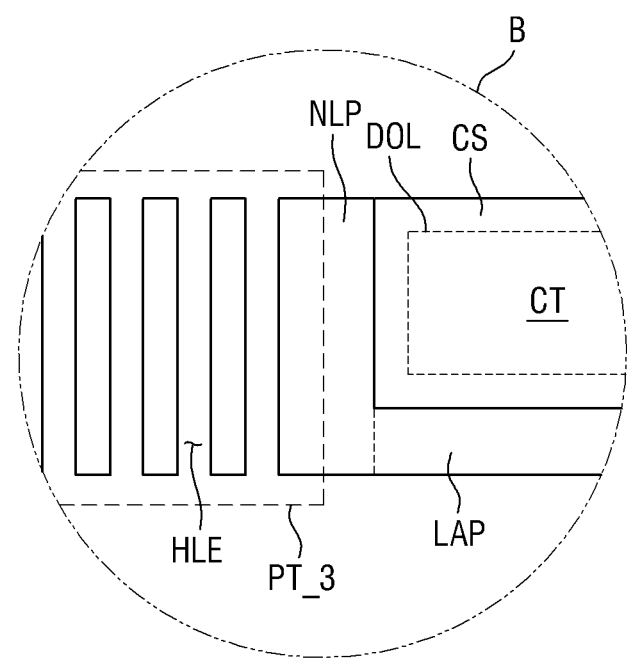
FIG. 15 is an enlarged view of region B of FIG. 14.

FIG. 14 is a schematic cross-sectional view of a protection member according to an embodiment. FIG. 15 is an enlarged view of region B of FIG. 14.

Referring to FIGS. 14 and 15, an impact absorbing pattern PT_3 of a protection member 100_3 according to an embodiment may be different from an embodiment of FIG. 3 in that the impact absorbing pattern PT_3 may include holes HLE, not the grooves GR.

As an example, the protection member 100_3 according to an embodiment may include the impact absorbing pattern PT_3 in the outer protruding portion NPL of the functional coating layer 120, and the impact absorbing pattern PT_3 may include holes HLE. The holes HLE may be surrounded by the functional coating layer 120 and may penetrate the functional coating layer 120 in the thickness direction. In the cross-sectional view, each of the holes HLE is shown to have an approximately constant diameter. However, the disclosure is not limited thereto, and the holes HLE may be formed in various shapes. For example, as it goes from the top surface US of the functional coating layer 120 toward the bottom surface BS thereof, the diameter of each hole HLE in the cross-sectional view may gradually increase, gradually decrease, or gradually increase and decrease. The inside of the hole HLE may be an empty space or may be filled with a material that may absorb and alleviate the impact applied from the outside.

The thickness of the outer protruding portion NLP of the functional coating layer 120 present between the holes HLE may be substantially equal to the sum of the thickness of the substrate overlapping portion LAP and the thickness of the glass substrate 110 overlapping it.

In the drawing, although the functional coating layers 120 present among the holes HLE are shown to be separated from each other, the holes HLE may be distributed in the outer protruding portion NLP of the functional coating layer 120, and functional coating layers 120, for example, the outer protruding portions NLP present among the holes HLE may be connected or coupled to each other.

Even in this case, since the outer protruding portion NLP may include the impact absorbing pattern PT_3, the impact applied from the outside, for example, the impact applied from the side of the functional coating layer 120 may be alleviated, and thus it may be possible to prevent or suppress the glass substrate 110 from being damaged or broken due to the external impact.

Figure 16:
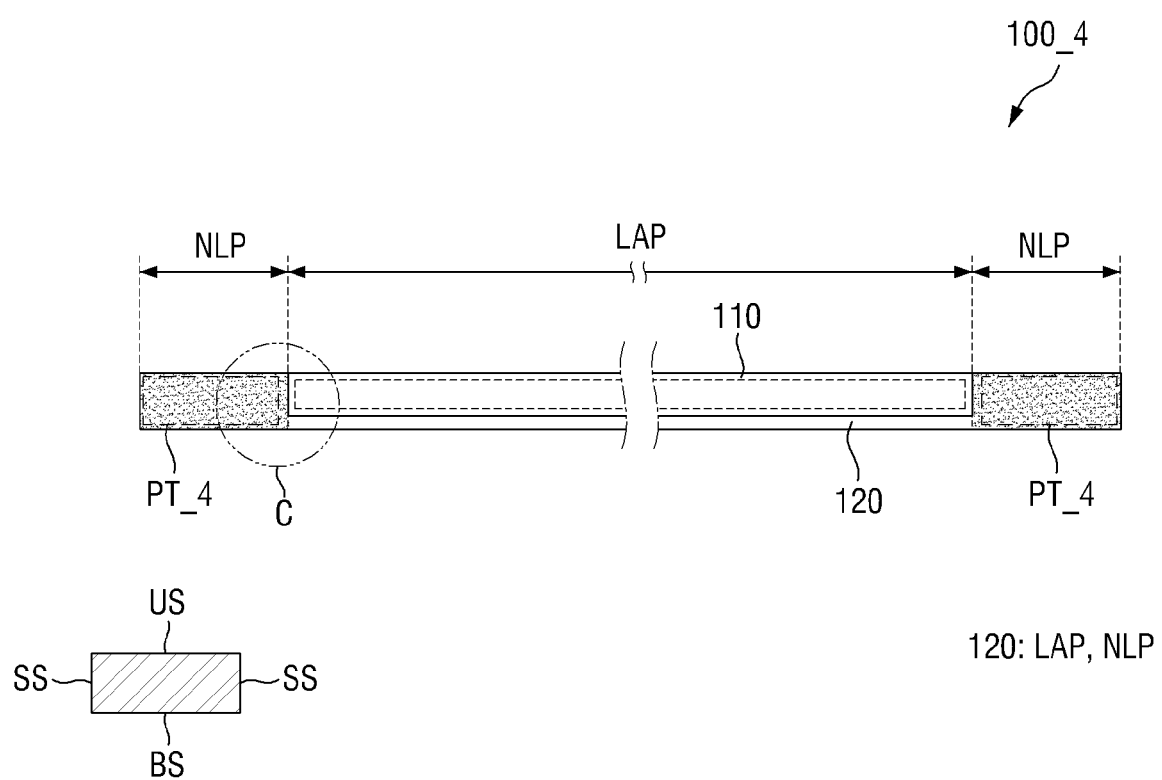
FIG. 16 is a schematic cross-sectional view of a protection member according to an embodiment.
Figure 17:
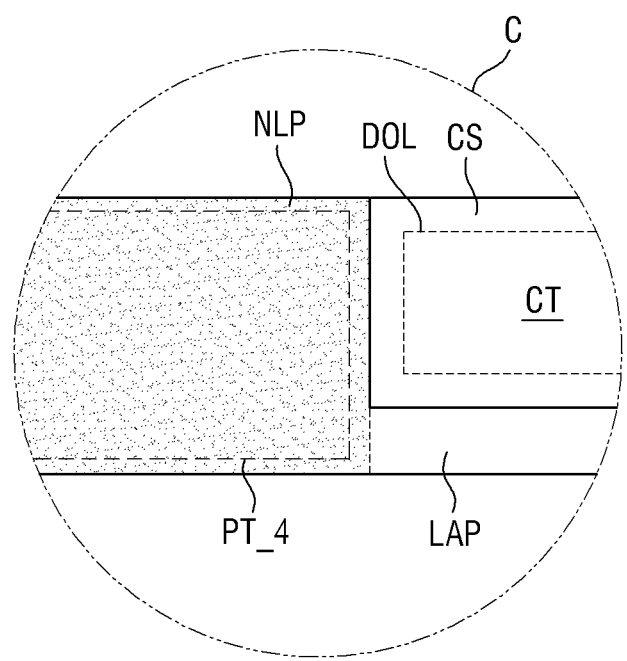
FIG. 17 is an enlarged view of region C of FIG. 16.

FIG. 16 is a schematic cross-sectional view of a protection member according to an embodiment. FIG. 17 is an enlarged view of region C of FIG. 16.

Referring to FIGS. 16 and 17, an impact absorbing pattern PT_4 of a protection member 100_4 according to an embodiment may be different from an embodiment of FIG. 3 in that at least a part of the impact absorbing pattern PT_4 may be formed in a sponge-like shape. The sponge-like shape may conform to the shape of the impact absorbing pattern PT_4 and may be a porous or absorbent material.

As an example, the protection member 100_4 according to an embodiment may include the impact absorbing pattern PT_4 which may be disposed in the outer protruding portion NLP of the functional coating layer 120 to be formed in the sponge-like shape. The outer protruding portion NLP of the functional coating layer 120 may partially or entirely have the sponge-like shape. For example, the outer protruding portion NLP may partially or entirely include therein empty spaces surrounded by the functional coating layer. The empty spaces may be apertures or cavities, by way of non-limiting example.

Even in this case, since the outer protruding portion NLP may include the impact absorbing pattern PT_4, the impact applied from the outside, for example, the impact applied from the side of the functional coating layer 120 may be alleviated, and thus it may be possible to prevent or suppress the glass substrate 110 from being damaged or broken due to the external impact.

Figure 18:
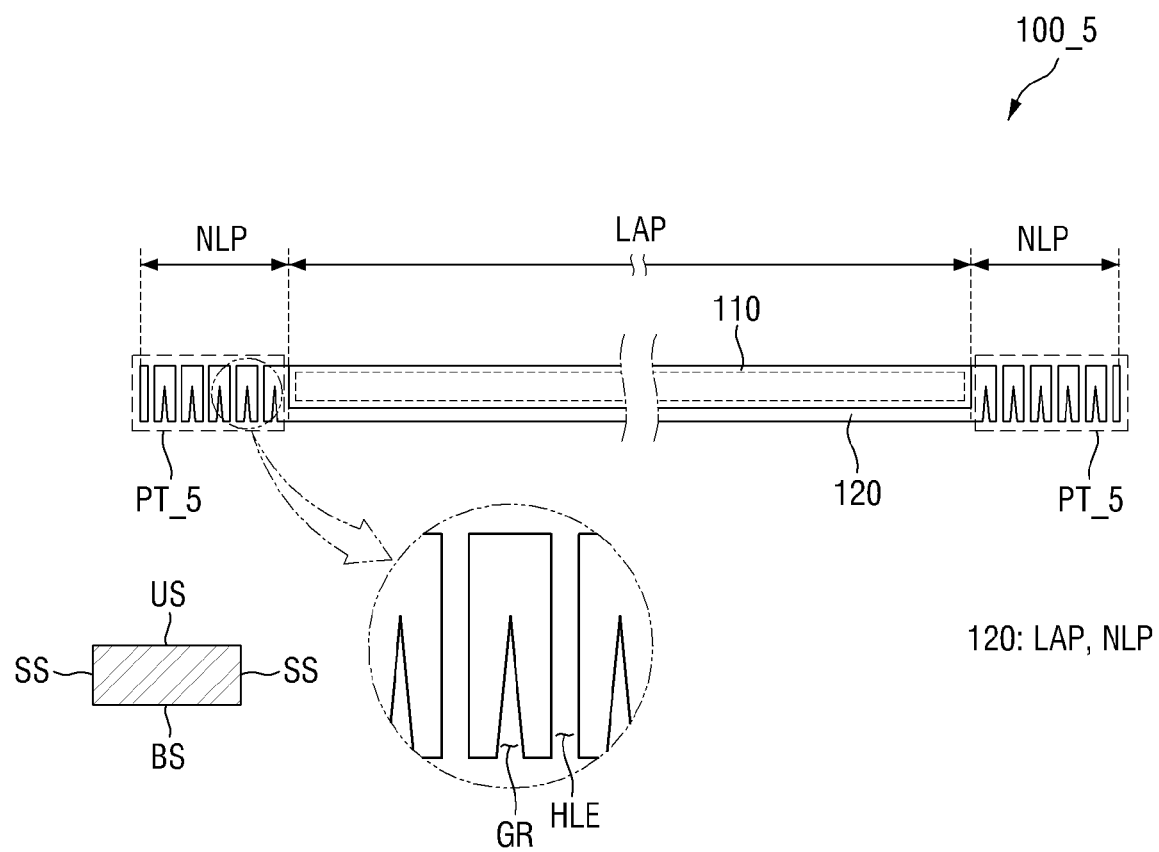
FIG. 18 is a schematic cross-sectional view of a protection member according to an embodiment.

FIG. 18 is a schematic cross-sectional view of a protection member according to an embodiment.

Referring to FIG. 18, an impact absorbing pattern PT_5 of a protection member 100_5 according to an embodiment may be different from an embodiment of FIG. 3 in that the impact absorbing pattern PT_5 may include both the grooves GR and the holes HLE.

As an example, the protection member 100_5 according to an embodiment may include the impact absorbing pattern PT_5 in the outer protruding portion NLP, which may include the grooves GR and the holes HLE. For example, the grooves GR and the holes HLE may be entirely disposed in the outer protruding portion NLP of the functional coating layer 120. The grooves GR and the holes HLE may be alternately arranged or disposed, but the disclosure is not limited thereto, and they may be randomly arranged or disposed.

Even in this case, since the outer protruding portion NLP may include the impact absorbing pattern PT_5, the impact applied from the outside, for example, the impact applied from the side of the functional coating layer 120 may be alleviated, and thus it may be possible to prevent or suppress the glass substrate 110 from being damaged or broken due to the external impact.

Figure 19:
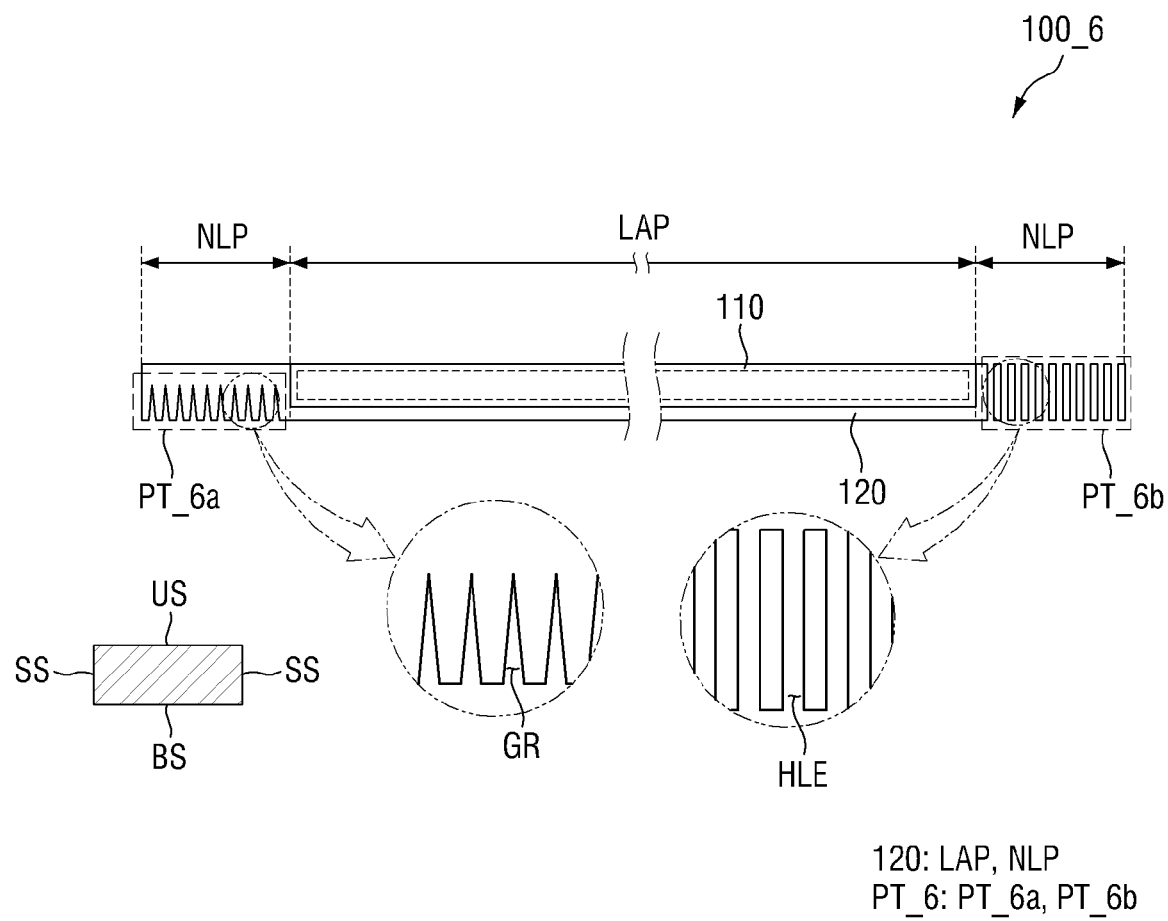
FIG. 19 is a schematic cross-sectional view of a protection member according to an embodiment.

FIG. 19 is a schematic cross-sectional view of a protection member according to an embodiment.

Referring to FIG. 19, an impact absorbing pattern PT_6 of a protection member 100_6 according to an embodiment may be different from an embodiment of FIG. 18 in that the impact absorbing pattern PT_6 may include the grooves GR in the outer protruding portion NLP disposed outside one side surface SS of the glass substrate 110 and the holes HLE in the outer protruding portion NLP disposed outside the other side surface SS of the glass substrate 110.

As an example, the impact absorbing pattern PT_6 according to an embodiment may include a first pattern PT_6a and a second pattern PT_6b. The first pattern PT_6a may be disposed outside one side surface SS of the glass substrate 110, and the second pattern PT_6b may be disposed outside the other side surface SS of the glass substrate 110. The first pattern PT_6a may include the grooves GR only, and the second pattern PT_6b may include the holes HLE only. It is to be understood, however, that the first pattern PT_6a may include the holes HLE only, and the second pattern PT_6b may include the grooves GR only. For example, the impact absorbing pattern PT_6 according to an embodiment may include the first pattern PT_6a and the second pattern PT_6b which may be different from each other.

Even in this case, since the outer protruding portion NLP may include the impact absorbing pattern PT_6, the impact applied from the outside, for example, the impact applied from the side of the functional coating layer 120 may be alleviated, and thus it may be possible to prevent or suppress the glass substrate 110 from being damaged or broken due to the external impact.

Figure 20:
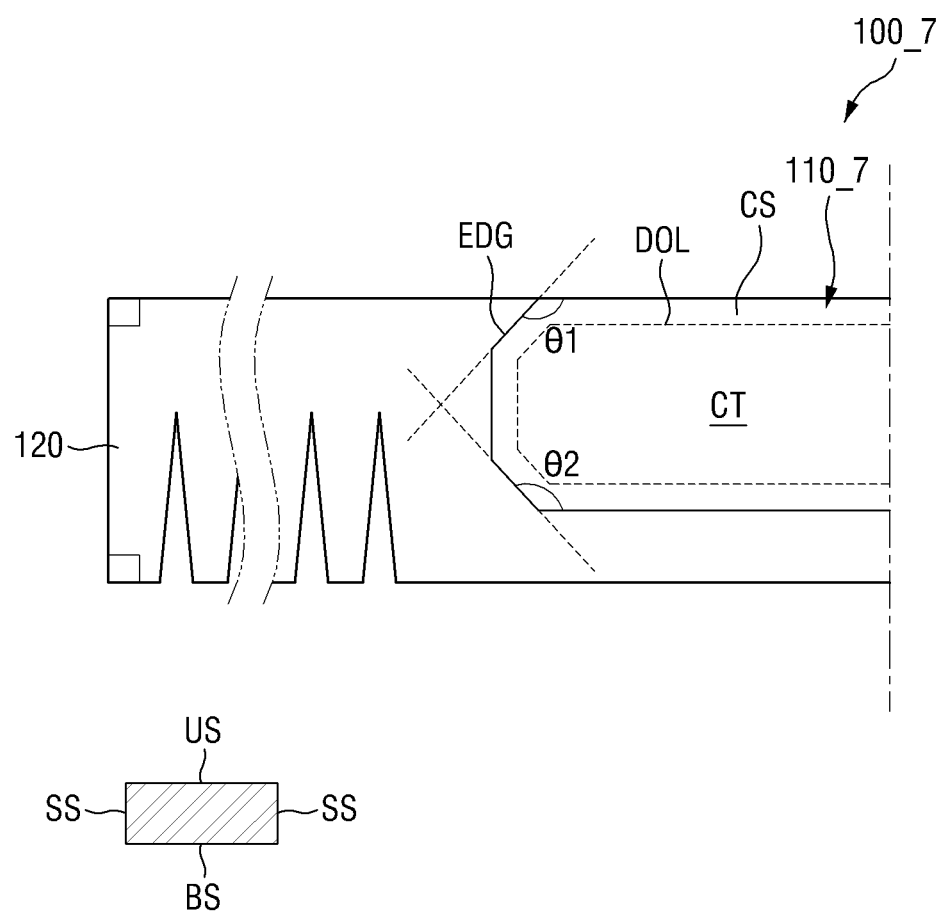
FIG. 20 is a partial schematic cross-sectional view of a protection member according an embodiment.

FIG. 20 is a partial schematic cross-sectional view of a protection member according to an embodiment.

Referring to FIG. 20, a protection member 100_7 according to an embodiment may be different from an embodiment of FIG. 3 in that a glass substrate 110_7 may have an inclined edge EDG (a portion or a region where two or more surfaces may meet). For example, the glass substrate 110_7 may be obtained by cutting a mother glass substrate into cell units, and then machining an edge portion or a region of the cut glass substrate into a flat surface or a curved surface through polishing or cutting to prevent damage to the edge portion or region. The edge surface EDG may substantially have obtuse angles θ1 and θ2 with respect to adjacent surfaces (the top surface US and the side surface SS in the drawing).

The functional coating layer 120 may cover or overlap the edge surface EDG of the glass substrate 110_7 but may not reflect the shape of the edge surface EDG. For example, the side surface SS of the functional coating layer 120 may be the cut surface to have an angle substantially perpendicular to the top surface US and the bottom surface BS.

The glass substrate 110_7 of FIG. 20 may be replaced with the glass substrate 110 illustrated in FIGS. 3 to 19.

Figure 21:
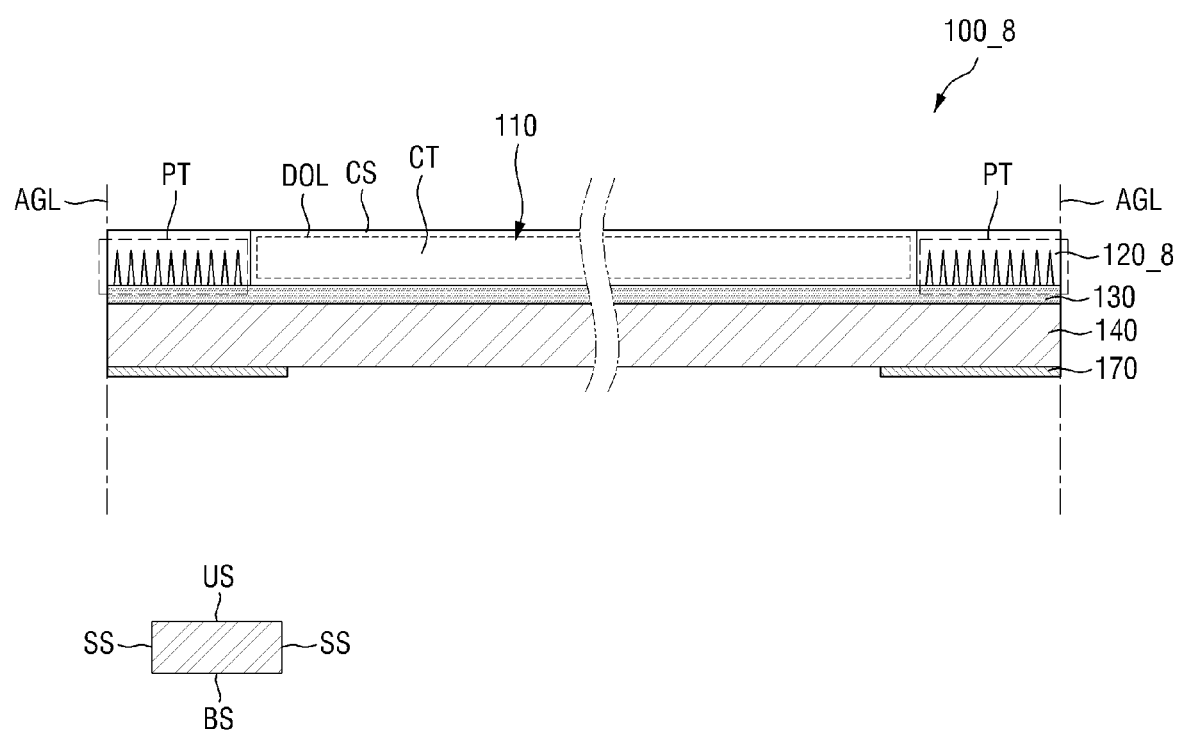
FIG. 21 is a schematic cross-sectional view of a protection member according to an embodiment.

FIG. 21 is a schematic cross-sectional view of a protection member according to an embodiment.

Referring to FIG. 21, a protection member 100_8 according to an embodiment may be different from an embodiment of FIG. 6 in that a functional coating layer 120_8 may be disposed only on the side surface SS of the glass substrate 110.

As an example, the functional coating layer 120_8 may be disposed at an edge portion or region of the glass substrate 110 in a plan view, and may not overlap the glass substrate 110 in the thickness direction. The top surface US of the functional coating layer 120_8 may be substantially on the same plane as the top surface US of the glass substrate 110, and the bottom surface BS of the functional coating layer 120_8 may be substantially on the same plane as the bottom surface BS of the glass substrate 110. The thickness of the functional coating layer 120_8 may be substantially the same as the thickness of the glass substrate 110. The bottom surface BS of the glass substrate 110 may be exposed without being covered or overlapped by the functional coating layer 120_8, and the bonding layer 130 may be attached or disposed to the bottom surface BS of the functional coating layer 120_8 and the bottom surface BS of the glass substrate 110.

Even in this case, the side surface SS of the protection member 100_8 may include the side surfaces of functional coating layer 120_8, the bonding layer 130, and the film layer 140, which may be aligned with each other. Therefore, in a case that attaching the protection member 100_8 to the display panel 200 to install it in the set of the display device 10, the assembly tolerance may be minimized, thereby improving the process efficiency.

Since the outer protruding portion NLP may include the impact absorbing pattern PT, the impact applied from the outside, for example, the impact applied from the side of the functional coating layer 120_8 may be alleviated, and thus it may be possible to prevent or suppress the glass substrate 110 from being damaged or broken due to the external impact.

Hereinafter, the above-described embodiments will be described in more detail through fabrication examples and experimental examples.

Fabrication Example 1

A protection member was fabricated to have a structure, in which a glass substrate having a thickness of about 30 μm is directly attached to a film layer by using a bonding layer without a functional coating layer.

Fabrication Example 2

A protection member was fabricated, which includes a glass substrate having a thickness of about 30 μm and a functional coating layer surrounding the glass substrate, but does not include an impact absorbing pattern, by adopting the laser cutting process of FIG. 10.

Comparative Example 1

A protection member was fabricated, which includes a glass substrate having a thickness of about 30 μm, a functional coating layer, and an impact absorbing pattern, and in which side surfaces of components are aligned, by the fabricating processes of FIGS. 6 to 12.

<Experimental Example 1> Impact Resistance Characteristics

Load weight drop experiments were performed on the protection members according to Fabrication Examples 1 and 2 and Comparative Example 1. While a height of the load weight was varied by centimeters, the load weight was dropped on the protection member to confirm a height of the load weight which causes the protection member to be broken or a height of the load weight which causes the protection member to be scratched.

The results according to Experimental Example 1 are shown in Table 1 below.

TABLE 1

| Example | Structure | Impact resistance |
|---|---|---|
| Fabrication example 1 | Glass substrate, bonding layer and film layer | Broken when drop height was about 5 cm |
| Fabrication example 2 | Glass substrate, functional coating layer, bonding layer and film layer (aligned) | Broken when drop height was about 15 cm |
| Comparative example 1 | Glass substrate, functional coating layer, bonding layer, film layer and impact absorbing pattern (aligned) | Broken when drop height was about 30 cm |

Referring to Table 1, Comparative Example 1 including the impact absorbing pattern was confirmed to have improved impact resistance compared to Fabrication Examples 1 and 2 not including the impact absorbing pattern. For example, in the case of Fabrication Example 1, the protection member was broken when the drop height was about 5 cm, and in the case of Fabrication Example 2, the protection member was broken when the drop height was about 15 cm. In the case of Comparative Example 1 including the impact absorbing pattern, the protection member was broken when the drop height was about 30 cm, which is higher than those of Fabrication Examples 1 and 2. Therefore, it was confirmed that Comparative Example 1 has excellent impact resistance compared to Fabrication Examples 1 and 2.

In concluding the detailed description, those skilled in the art will appreciate that many variations and modifications may be made to the embodiments without substantially departing from the principles of the disclosure. Therefore, the disclosed embodiments are used in a generic and descriptive sense only and not for purposes of limitation.

What is claimed is:

1. A protection member for display, comprising:
a glass substrate including:
a surface and an another surface facing each other in a thickness direction; and
a side surface extended between the surface and the another surface;
a coating layer that overlaps the surface of the glass substrate and contacts the side surface of the glass substrate, the coating layer including:
a first portion which overlaps the surface of the glass substrate in the thickness direction and a second portion which does not overlap the surface of the glass substrate in the thickness direction,
an impact absorbing pattern disposed at the second portion of the coating layer and including at least one selected from grooves and holes,
wherein a maximum thickness of the second portion of the coating layer measured in the thickness direction is thicker than a thickness of the glass substrate measured in the thickness direction.

2. The protection member of claim 1, wherein the coating layer further includes a surface and another surface facing each other in the thickness direction, and
wherein at least one of the surface and the another surface of the coating layer includes an uneven surface.

3. The protection member of claim 1, wherein the impact absorbing pattern is disposed outside of the side surface of the glass substrate.

4. The protection member of claim 1, wherein the at least one of the grooves and the holes does not overlap the glass substrate in the thickness direction.

5. The protection member of claim 1, wherein
the coating layer exposes the surface of the glass substrate, and
in an outer region of the side surface of the glass substrate, a surface of the coating layer is located on an extension surface of the surface of the glass substrate.

6. The protection member of claim 5, wherein an another surface of the coating layer which faces the surface of the coating layer in the thickness direction overlaps the another surface of the glass substrate.

7. The protection member of claim 6, wherein the another surface of the coating layer is parallel to the surface of the coating layer and the surface of the glass substrate.

8. The protection member of claim 1,
wherein the coating layer further comprises a surface and an another surface facing each other in the thickness direction, and a side surface extended between the surface of the coating layer and the another surface of the coating layer,
wherein the protection member further comprises:
a bonding layer disposed on the another surface of the coating layer; and
a film layer disposed on an another surface of the bonding layer, the film layer having side surfaces,
wherein the side surfaces of the coating layer and a side surface of the bonding layer and a side surface of the film layer are aligned with each other.

9. The protection member of claim 1,
wherein the maximum thickness of the second portion of the coating layer is substantially equal to a sum of the thickness of the first portion and the thickness of the glass substrate.

10. The protection member of claim 1, wherein
the glass substrate includes a compression region and a tensile region, and
the compression region is adjacent to the surface, the another surface and the side surface of the glass substrate.

11. The protection member of claim 1, wherein the coating layer includes at least one of epoxy acrylate resin, polyester acrylate resin, polyether acrylate resin, urethane acrylate resin, acrylic acrylate resin, unsaturated polyester, urethane resin, acrylonitrile-butadiene-styrene (ABS) resin, and rubber.

12. A display device comprising:
a display panel; and
a protection member disposed on a surface of the display panel, wherein the protection member includes:
a glass substrate including:
a surface and an another surface facing each other in a thickness direction; and a side surface extended between the surface and the another surface;
a coating layer that overlaps the surface of the glass substrate and contacts the side surface of the glass substrate, the coating layer including:
 a first portion which overlaps the surface of the glass substrate in the thickness direction and a second portion which does not overlap the surface of the glass substrate in the thickness direction;
 an impact absorbing pattern disposed at the second portion of the coating layer and including at least one selected from grooves and holes;
 a bonding layer disposed on an another surface of the coating layer; and
 a film layer disposed on an another surface of the bonding layer, wherein
a side surface of the coating layer, a side surfaces of the bonding layer, and a side surface of the film layer are aligned with each other, and
a maximum thickness of the second portion of the coating layer measured in the thickness direction is thicker than a thickness of the glass substrate measured in the thickness direction.

13. The display device of claim 12, wherein the impact absorbing pattern is disposed outside of the side surface of the glass substrate.

14. The display device of claim 12, wherein at least one of a surface of the coating layer and the another surface of the coating layer includes an uneven surface.

15. A method for fabricating a protection member for display, the method comprising:
preparing a glass substrate including a surface and an another surface facing each other in a thickness direction, and a side surface extended between the surface and the another surface;
coating a functional composition on the glass substrate to form a coating layer overlapping the another surface and the side surface of the glass substrate;
forming an impact absorbing pattern which includes at least one selected from grooves and holes at the coating layer; and
cutting a surface of the coating layer located outside of the side surface of the glass substrate,
wherein the coating layer includes a first portion which overlaps the surface of the glass substrate in the thickness direction and a second portion which does not overlap the surface of the glass substrate in the thickness direction,
wherein the impact absorbing pattern is formed at the second portion of the coating layer and
wherein a maximum thickness of the second portion of the coating layer measured in the thickness direction is thicker than a thickness of the glass substrate measured in the thickness direction.

16. The method of claim 15, further comprising:
repairing the cut surface of the coating layer after the cutting.

17. The method of claim 16, wherein the repairing of the cut surface of the coating layer includes repairing the cut surface by laser irradiation.

18. The method of claim 17, wherein the repairing of the cut surface of the coating layer is performed by a laser sintering method.

19. The method of claim 15, further comprising:
sequentially laminating a bonding layer and a film layer on an another surface of the coating layer after the forming of the impact absorbing pattern,
wherein the cutting includes cutting the film layer, the bonding layer and the coating layer together.

* * * * *